(12) United States Patent
Hatasaki et al.

(10) Patent No.: US 7,774,630 B2
(45) Date of Patent: Aug. 10, 2010

(54) METHOD, COMPUTING SYSTEM, AND COMPUTER PROGRAM FOR REDUCING POWER CONSUMPTION OF A COMPUTING SYSTEM BY RELOCATING JOBS AND DEACTIVATING IDLE SERVERS

(75) Inventors: Keisuke Hatasaki, Kawasaki (JP);
Takao Nakajima, Yokohama (JP);
Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 11/866,896

(22) Filed: Oct. 3, 2007

(65) Prior Publication Data

US 2008/0065919 A1 Mar. 13, 2008

Related U.S. Application Data

(63) Continuation of application No. 11/522,374, filed on Sep. 18, 2006.

(30) Foreign Application Priority Data

May 22, 2006 (JP) .............................. 2006-141426

(51) Int. Cl.
*G06F 1/00* (2006.01)
*G06F 1/26* (2006.01)
*G06F 1/32* (2006.01)
*G06F 15/16* (2006.01)
*G06F 9/46* (2006.01)

(52) U.S. Cl. ....................... 713/320; 713/300; 713/323; 713/324; 709/201; 718/100

(58) Field of Classification Search ................. 713/300, 713/320, 323, 324; 709/201; 718/100
See application file for complete search history.

(56) References Cited

U.S. PATENT DOCUMENTS 6,345,240 B1 * 2/2002 Havens .......................... 703/21

(Continued)

FOREIGN PATENT DOCUMENTS

EP 1715405 A1 10/2006
JP 2005063066 3/2005

OTHER PUBLICATIONS

E. Pinheiro, et al "Load Balancing and Unbalancing for Power and Performance in Cluster-Based Systems", May 2001, pp. 1-11.

(Continued)

*Primary Examiner*—Ji H Bae
(74) *Attorney, Agent, or Firm*—Brundidge & Stanger, P.C.

(57) ABSTRACT

In a computing system where multiple servers are connected through a network and one or more jobs are run, a power reduction facility of a supervisory server relocates jobs according to predetermined conditions, thereby reducing the amount of power consumed by the computing system. For relocating the jobs, the power reduction facility obtains server-related information such as the power properties of the servers constituting the computing system and job-related information such as performance requirements for the jobs which are run in the computing system, and searches for one or more jobs to be relocated and destination servers, based on these server-related information and job-related information, to the extent that the performance requirements for each job are fulfilled. Based on the search results, the jobs are relocated to the destination servers, and servers on which no job is running, in consequence of the relocation, are powered off.

18 Claims, 32 Drawing Sheets

U.S. PATENT DOCUMENTS

| | | | |
|---|---|---|---|
| 6,957,353 B2 | 10/2005 | Bresniker et al. | 713/320 |
| 6,986,066 B2* | 1/2006 | Morrow et al. | 713/320 |
| 7,039,638 B2* | 5/2006 | Zhang et al. | 707/7 |
| 7,043,650 B2 | 5/2006 | Bresniker et al. | |
| 7,096,248 B2* | 8/2006 | Masters et al. | 709/201 |
| 7,203,846 B2 | 4/2007 | Bresniker et al. | |
| 7,548,977 B2* | 6/2009 | Agapi et al. | 709/226 |
| 2003/0079151 A1 | 4/2003 | Bohrer et al. | 713/320 |
| 2003/0084088 A1* | 5/2003 | Shaffer | 709/104 |
| 2003/0084357 A1 | 5/2003 | Bresniker et al. | |
| 2003/0084358 A1 | 5/2003 | Bresniker et al. | |
| 2003/0084359 A1 | 5/2003 | Bresniker et al. | |
| 2003/0115495 A1 | 6/2003 | Rawson, III | |
| 2005/0060590 A1 | 3/2005 | Bradley et al. | |
| 2005/0132239 A1* | 6/2005 | Athas et al. | 713/300 |
| 2006/0036878 A1* | 2/2006 | Rothman et al. | 713/300 |
| 2006/0112286 A1 | 5/2006 | Whalley et al. | |

OTHER PUBLICATIONS

E. Pinheiro et al "Dynamic Cluster Reconfiguration for Power and Performance", Compilers and Operating Systems for Low Power, 2003, pp. 1-20.

* cited by examiner

FIG. 5
SERVER TABLE 410

| SERVER IDENTIFIER (501) | PERFORMANCE (502) | POWER CONSUMPTION (503) |
|---|---|---|
| SERVER 1 | 300bops | 300W |
| SERVER 2 | 500bops | 600W |
| SERVER 3 | 900bops | 810W |
| SERVER 4 | 100bops | 400W |

FIG. 6
JOB TABLE 411

| JOB IDENTIFIER (601) | SERVER RUNNING THE JOB (602) | PERFORMANCE REQUIREMENTS (603) |
|---|---|---|
| a | SERVER 1 | 100bops |
| b | SERVER 1 | 200bops |
| c | SERVER 2 | 300bops |
| d | SERVER 2 | 50bops |
| e | SERVER 3 | 200bops |
| f |  | 300bops |

FIG. 10
SERVER TABLE 410A

| SERVER IDENTIFIER | PERFORMANCE | POWER CONSUMPTION | POWER CONSUMPTION PER UNIT OF PERFORMANCE |
|---|---|---|---|
| SERVER 1 | 300bops | 300W | 1.0 |
| SERVER 2 | 500bops | 600W | 1.2 |
| SERVER 3 | 900bops | 810W | 0.9 |
| SERVER 4 | 100bops | 400W | 4 |

FIG. 24

SERVER TABLE 410B

| SERVER IDENTIFIER | PERFORMANCE | POWER CONSUMPTION | POWER CONSUMPTION PER UNIT OF PERFORMANCE |
|---|---|---|---|
| SERVER 1 | 300bops | 300W | 1.0 |
| | 200bops | 300W | 1.5 |
| | 100bops | 300W | 3 |
| | 0bops | 300W | — |
| SERVER 2 | 500bops | 600W | 1.2 |
| | 300bops | 450W | 1.5 |
| | 100bops | 200W | 2 |
| | 0bops | 100W | — |
| SERVER 3 | 900bops | 810W | 0.9 |
| | 500bops | 720W | 1.44 |
| | 100bops | 630W | 6.3 |
| | 0bops | 300W | — |
| SERVER 4 | 100bops | 400W | 4 |
| | 50bops | 50W | 1 |
| | 10bops | 10W | 1 |
| | 0bops | 10W | — |

JOB TABLE 411A

| JOB IDENTIFIER | SERVER RUNNING THE JOB | PERFORMANCE REQUIREMENT | LOAD VARIATION CHARACTERISTIC |
|---|---|---|---|
| a | SERVER 1 | 100bops | CONSTANT |
| b | SERVER 1 | 200bops | CONSTANT |
| c | SERVER 2 | 300bops | LARGE VARIATION |
| d | SERVER 2 | 50bops | LARGE VARIATION |
| e | SERVER 3 | 200bops | CONSTANT |

FIG. 27
JOB TABLE 411B

| JOB IDENTIFIER 601 | SERVER RUNNING THE JOB 602 | PERFORMANCE REQUIREMENT 603 | JOB PROPERTIES 604 | PRIORITY 605 |
|---|---|---|---|---|
| a | SERVER 1 | 100bops | CONSTANT | HIGH |
| b | SERVER 1 | 200bops | CONSTANT | LOW |
| c | SERVER 2 | 300bops | LARGE VARIATION | MEDIUM |
| d | SERVER 2 | 50bops | LARGE VARIATION | HIGH |
| e | SERVER 3 | 200bops | CONSTANT | IMPOSSIBLE |

SEARCH POLICY TABLE 412

| POLICY NO. | SEARCH POLICY |
|---|---|
| 1 | LEVELING POWER CONSUMPTIONS OF SERVERS |
| 2 | UTILIZATION AT A PERFORMANCE VALUE CORRESPONDING TO LOW POWER EFFICIENCY PER UNIT OF PERFORMANCE OF EACH SERVER |
| 3 | ONLY ONE JOB TO BE RUN ON SERVER 2 |

METHOD, COMPUTING SYSTEM, AND COMPUTER PROGRAM FOR REDUCING POWER CONSUMPTION OF A COMPUTING SYSTEM BY RELOCATING JOBS AND DEACTIVATING IDLE SERVERS

CLAIM OF PRIORITY

The present application is a continuation of application Ser. No. 11/522,374, filed Sep. 18, 2006, which claims priority from Japanese application serial JP 2006-141426 filed on May 22, 2006, the contents of which are hereby incorporated by reference into this application.

BACKGROUND OF THE INVENTION

The present invention relates to a technique for reducing the power consumption of a computing system.

For information processing equipment such as servers which constitute a computing system, the amount of power consumed by each server increases with enhanced server performance. Further, the use of high-density information processing systems such as blade servers requires a huge amount of power to be distributed to them at a high density. Thus, the cost required for supplying power to such information processing equipment and/or systems and cooling them increases more and more.

In view hereof, in a distributed processing system such as a grid computing where computer processing tasks of assumed amounts of computing are allocated to and executed by systems which reside in a plurality of areas respectively, there is a method for avoiding a high power demand localized in an area making it hard to supply power to the system in that area by leveling the power loads used in each area, for example, as described in Japanese Patent Laid-Open No. 2005-63066.

There is also a technique for reducing the power consumption of a server by decreasing the operating frequency of its CPU and decreasing the CPU performance, which is provided by a CPU (Central Processing Unit) manufacturer such as Intel Corporation.

SUMMARY OF THE INVENTION

However, the technique as described above allows for reducing the power consumption of a computing system in an area, but cannot reduce the power consumption of the whole computing system covering all the areas and, therefore, cannot reduce the cost required for supplying power to the whole computing system.

However, by the technique for power consumption reduction by decreasing the CPU operating frequency, the server performance is decreased, which results in a decrease in the performance of a job being run on the server. This may result in that performance requirements for the job such as Service Level Agreement (SLA) required of the computing system by a user to run the job required by a user cannot be fulfilled.

An object of the present invention is to provide a method, a system and a computer program for reducing the power consumption of a computing system, the method, the system and the computer program capable of reducing the power consumed by the computing system in which a plurality of servers are connected by a network and one or more jobs are run.

To achieve the above object, an aspect of the present invention provides a method for reducing the power consumption of a computing system where a plurality of servers are connected via a network and one or more jobs are run, the method comprising the following steps which are executed by at least one of the plurality of servers: obtaining server-related information including power properties of each of the servers constituting the computing system; obtaining job-related information including performance requirements for each of the jobs which are run in the computing system; searching for one or more jobs to be relocated and one or more destination servers, based on these server-related information job-related information, to the extent that the performance requirements for each job are fulfilled; relocating one or more jobs selected to be relocated through the search to one or more destination servers selected through the search; and controlling power supply to turn off the power supply of one or more servers on which no job is running in consequence of the relocation, if such a server exists. Another aspect of the invention provides a system for reducing the power consumption thereof and a computer program for reducing the power consumption.

Terms used herein are described. A servers refers to all system components having a minimum configuration with at least a processor (CPU) and a storage device (memory) (i.e., a computer-readable storage medium) and capable of executing a job. Among the servers, a supervisory server refers to a special server on which only a power reduction program is executed and for which the method for reducing power consumption is not applied. A job is a generic term used to refer to programs which perform processing in response to an input and returns an output. The program for reducing the power consumption, which will be described by using a concrete example, is not included in the jobs.

In a computing system where a plurality of servers are connected via a network and one or more jobs are run, the method according to the invention searches for one or more jobs to be relocated and one or more destination servers, based on the power properties of the servers and the performance requirements for each job, to the extent that the performance requirements for each job are fulfilled, relocates the one or more jobs, and shuts off the power supply of one or more servers on which no job is running. Thus, it is possible to reduce the power consumed, while complying with the SLA of the computing system.

BRIEF DESCRIPTION OF THE DRAWINGS

FIG. 5 illustrates a server table 410 in the first embodiment.

FIG. 6 illustrates a job table 411 in the first embodiment.

FIG. 10 illustrates a server table 410A to which a column for power consumption per unit of performance of a server was added.

FIG. 24 illustrates a sever table 410B in the third embodiment.

FIG. 27 illustrates a job table 411B in a fifth embodiment of the invention.

DETAILED DESCRIPTION OF THE INVENTION

Embodiment 1

In the following, illustrative embodiments of the present invention will be described with the drawings.

Figure 1:
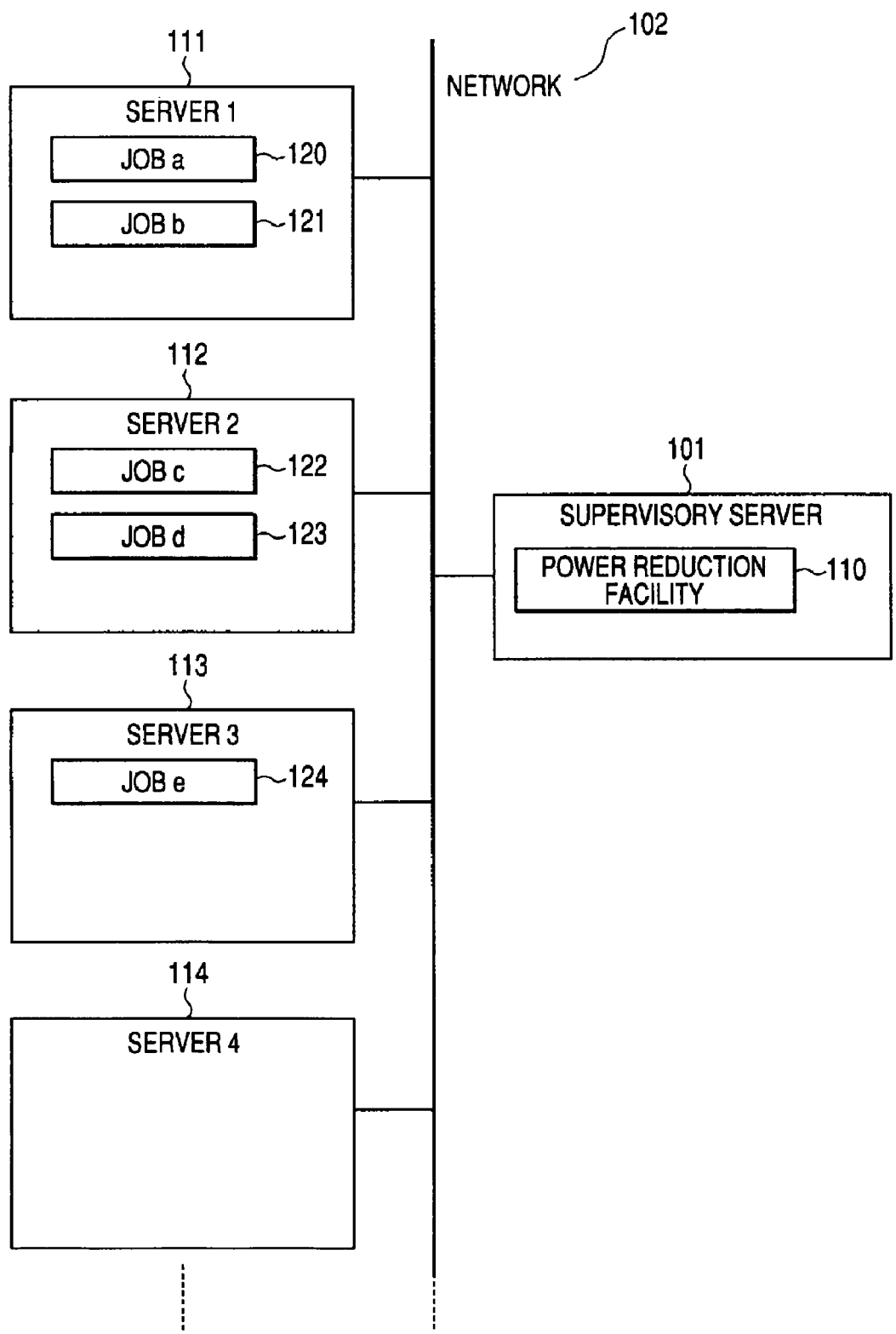
FIG. 1 shows an overall structural diagram of a computing system according to a first embodiment of the invention.

FIG. 1 shows an overall structural diagram of a computing system according to a first embodiment of the present invention. The computing system of the present embodiment comprises a plurality of servers 111-114 and a supervisory server 101. The servers 111-114 and the supervisory server are interconnected through a network 102. On the servers 111-114, jobs 120-124 are running. However, a server with no job running on it may exist like a server 114. In the figure, the jobs 120-124 are particularly appended with identifiers like Job a and Job b, if their contents are different.

Here, the jobs 120-124 are generic terms used to refer to programs which perform processing in response to an input and returns an output. A job may be, for example, an application program, EJB (registered trademark) application, Java (registered trademark) application, and one of processes running in an OS (Operating System). Furthermore, all programs such as an OS, drivers, middleware, and applications running together on a server may be regarded as a single job. Alternatively, by means of server virtualization technology such as Xen open source software and VMware (registered trademark) from VMware, Inc., it is possible to run one or more virtual servers on a single physical server. The servers 111-114 are equipped with resources such as processors (CPUs) and storage devices (memories).

Using the server virtualization technology, the resources of the servers 111-114 may be divided and allocated to different virtual servers, thereby allowing for simultaneous run of one or more virtual servers on a single physical server. Job a and Job b may be run on such virtual servers.

On the supervisory server 101, a power reduction facility 110 is run. The power reduction facility 110 is a computer program that performs control to reduce the power consumed by the servers 111-114; the details thereof will be described later. The number of the servers 111-114 and the number of the jobs 120-124, used in this embodiment, are only exemplary and these numbers may vary as required. There should be at least one supervisory server 101 and at least one power reduction facility.

Figure 2:
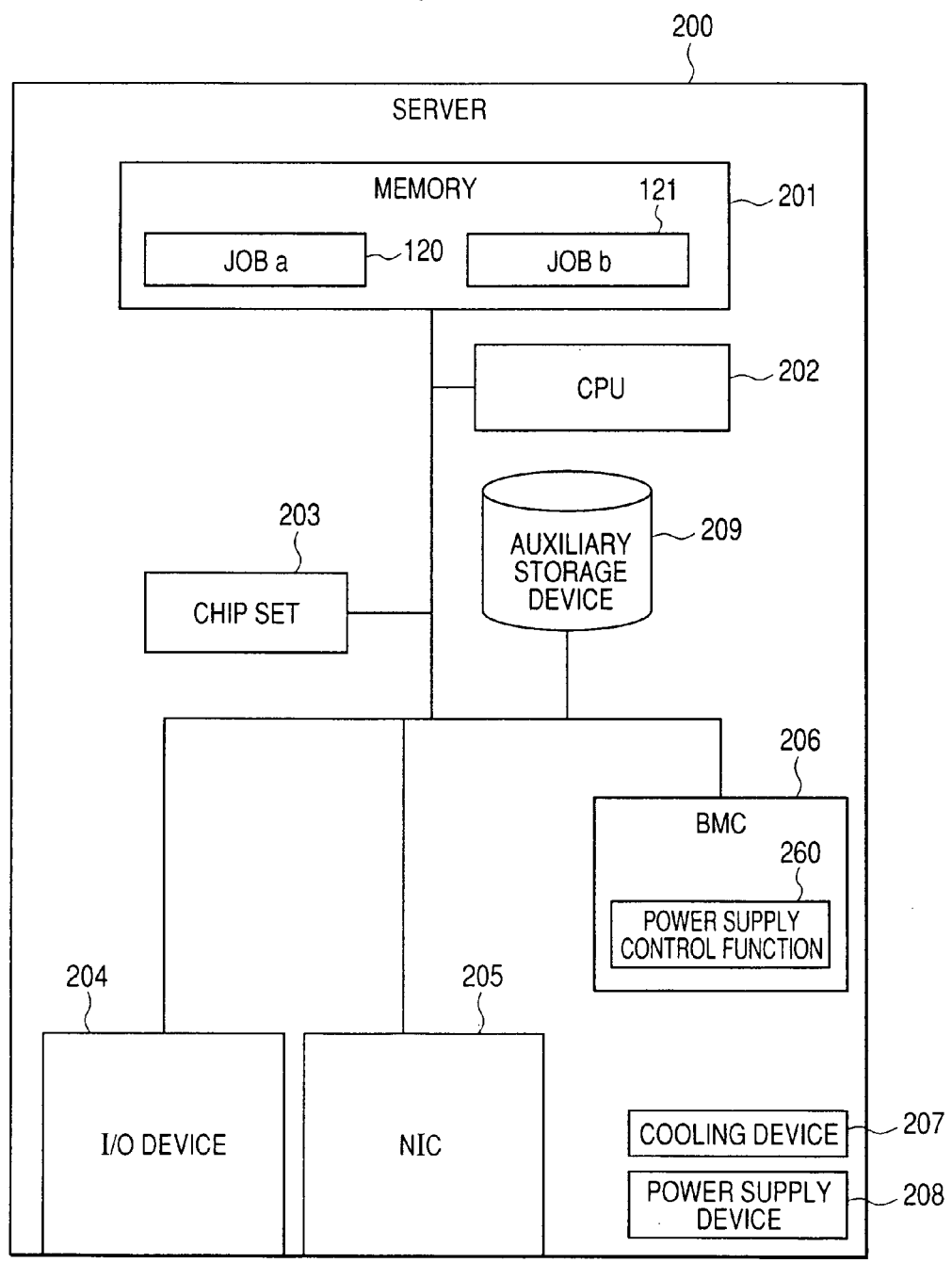
FIG. 2 shows a structural diagram of each server 111-114 in the first embodiment.

FIG. 2 shows a detailed structure of each server 111-114 in the first embodiment, wherein each server is represented as a server 200. The server 200 is composed of a memory 201 which stores programs such as jobs 120, 121, at least one CPU 202 which executes the programs from the memory, a chip set 203, an I/O device 204 such as a Host Bus Adapter (HBA) and a Network Interface Card (NIC), a NIC 205 for making connection to the network 102 in FIG. 1, a Baseboard Management Controller (BMC) 206 which is responsible for status monitoring and power supply control, a cooling device 207 such as a fan or a water cooler, a power supply device 208 for supplying the power of the server, and an auxiliary storage device 209 such as a hard disk or a flash memory. The BMC 206 is provided with a power supply control function 260, enabling power supply control, turning the power supply of the server 200 on and off from the outside via the NIC 205. Here, the server 200 does not always have to include all components shown in FIG. 2. It may be configured with at least the CPU 202 and the memory 201. By this configuration, jobs 120, 121 stored in the memory 201 can be executed by the CPU 202 and functionality as the server can be provided.

Figure 3:
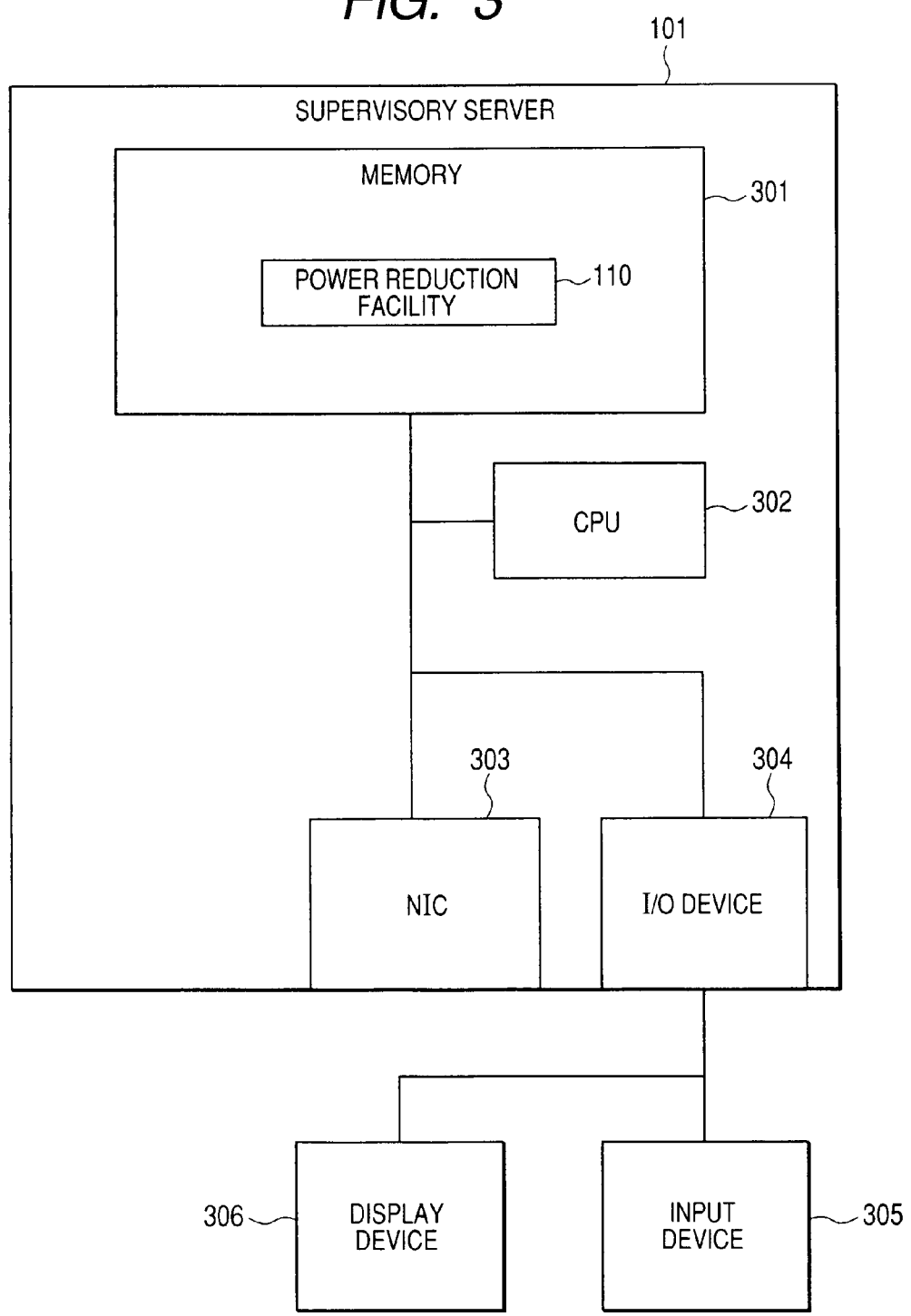
FIG. 3 shows a structural diagram of a supervisory server 101 in the first embodiment.

FIG. 3 shows a detailed structure of the supervisory server 101 as mentioned in FIG. 1 which illustrates the first embodiment. The supervisory server 101 is composed of a storage device (memory) 301 which stores the power reduction facility 110, at least one processor (CPU) 302 which executes programs from the memory, a NIC 303 for making connection to the network 102 in FIG. 1, and an I/O device 304 to which input devices such as a mouse, a keyboard, etc., storage such as USB media, a display device such as a display are connected and which is responsible for input/output of information to/from the server. To the I/O device 304, the input devices 305 such as the mouse and keyboard and the display device 306 such as a display are connected. Additionally, to the I/O device 304, an external storage device (not shown) may be connected for reading/writing information. Further, an internal storage device may be built into the supervisory server 101.

Figure 4:
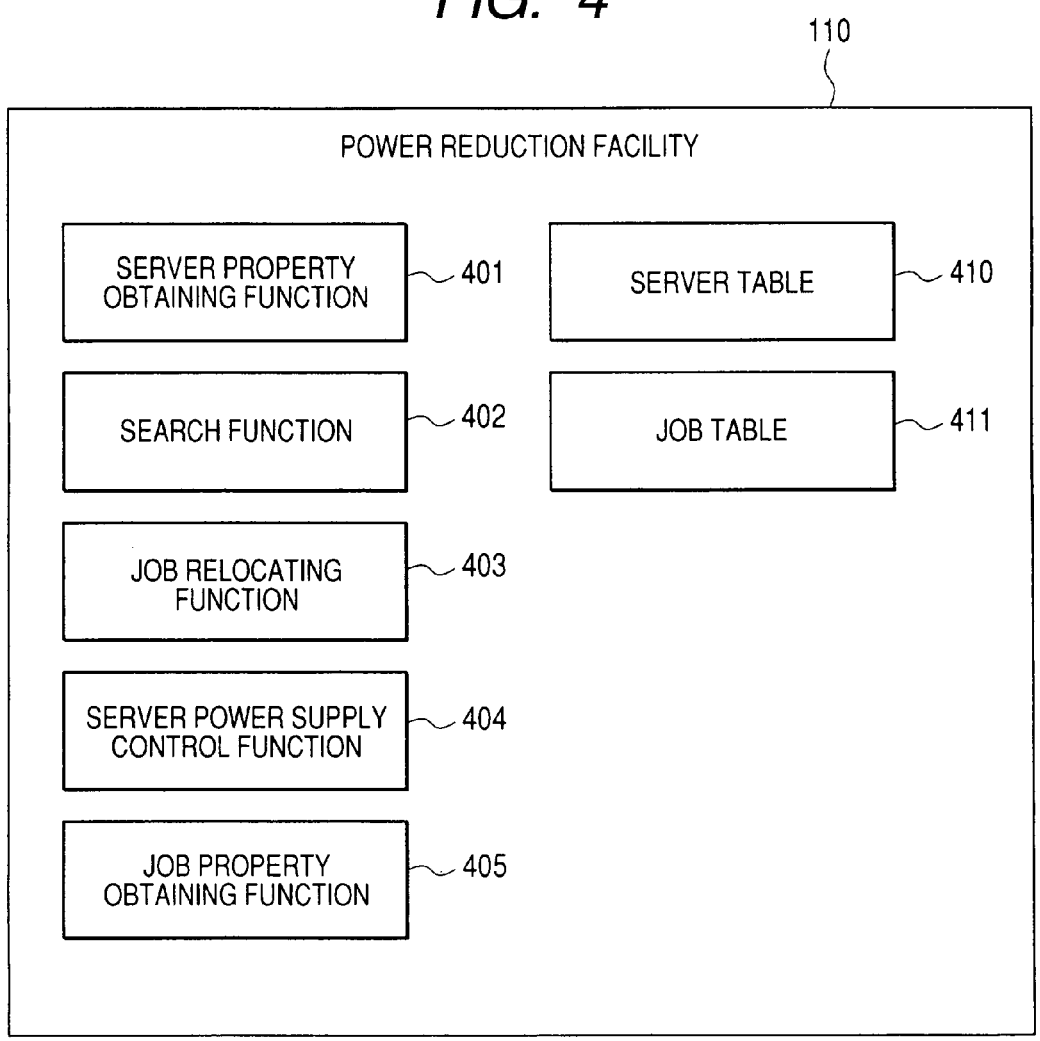
FIG. 4 shows a structural diagram of a power reduction facility 110 in the first embodiment.

FIG. 4 shows details of the power reduction facility 110 as mentioned in FIG. 1 illustrating the first embodiment. The power reduction facility 110 is stored in the memory 301 of the supervisory server 101 and consists of subprograms for performing several functions and tables in which information that is processed by these subprograms are stored. Specifically, the power reduction facility 110 is composed of a server properties obtaining function 401 which obtains the properties of the servers, a search function 402 which searches among the servers 111-114 in the computing system for a source server and a destination server from which/to which a job is relocated and searches among the jobs 120-124 for a job to be relocated, a job relocating function 403 which performs control to relocate a job from the source server to the destination server, a server power supply control function 404 which shuts off the power supply of a server on which no job is running, a job properties obtaining function 405 which obtains the properties of the jobs, a server table 410 containing a list of information for the servers 111-114 constituting the computing system, and a job table 411 containing a list of information for the jobs 120-124 to be run in the computing system. Here, the job table 411 may include information for other jobs along with the jobs 120-124 running in the computing system. The search function 402 searches for jobs and servers according to the following condition for relocation: more jobs shall be allocated to a server with a smallest or smaller value of power consumption per unit of performance to the extent that performance requirements for each job are fulfilled, thus maximizing the number of servers on which no job is running, as will be further detailed later.

FIG. 5 shows details of a concrete example of the server table 410 as mentioned in FIG. 4. The server table 410 contains information for all servers constituting the computing system. The method of obtaining the server table 410 will be described later. A first column 501 has the identifier of each server. A second column 502 has a value of performance of the corresponding server in the first column 501. A third column 503 has power consumption for the performance in the second column 502 of the corresponding server. In the present embodiment, the value of performance given in the second column 502 indicates the value of peak performance of the server identified by the server identifier in the first column 501. The power consumption given in the third column 503 includes, in addition to the power consumed by the CPU of the server identified in the first column 501, the power consumed by all components of the server, namely, memory, chip set, I/O device, NIC, cooling device, power supply device, auxiliary storage device, BMC, etc. The third column 503 may be subdivided to specify power consumption fractions for the components, namely, CPU, memory, chip set, I/O device, NIC, cooling device, power supply device, auxiliary storage device, BMC, etc. of the server identified in the first column 501.

FIG. 6 shows details of the job table 411 as mentioned in FIG. 4. The job table 411 contains information related to all jobs to be run in the computing system. How to obtain the job table 411 will be described later. A first column 601 has the identifier of a job. A second column 602 has the identifier of a server running the job identified in the first column 601 and the second column 602 corresponds to the first column 501 in the server table 410 shown in FIG. 5. Here, if the job identified in the first column 601 is not running, the second column 602 will be empty, like the job "f" the first column 601. A third column 603 has a value of performance requirements for the job identified in the first column 601. In the figure, for example, the job with the identifier "a" given in the first column 601 is required to be run at 100 bops as the performance given in the third column 603. Here, the third column 603 may be subdivided to specify performance requirements of not only the CPU performance, but also I/O performance to the network, internal storage device, and external storage device, and memory performance. The third column 603 value may be added and updated, triggered by an event that updates this table 411 or an event that updates only the third column 603 individually.

Figure 7:
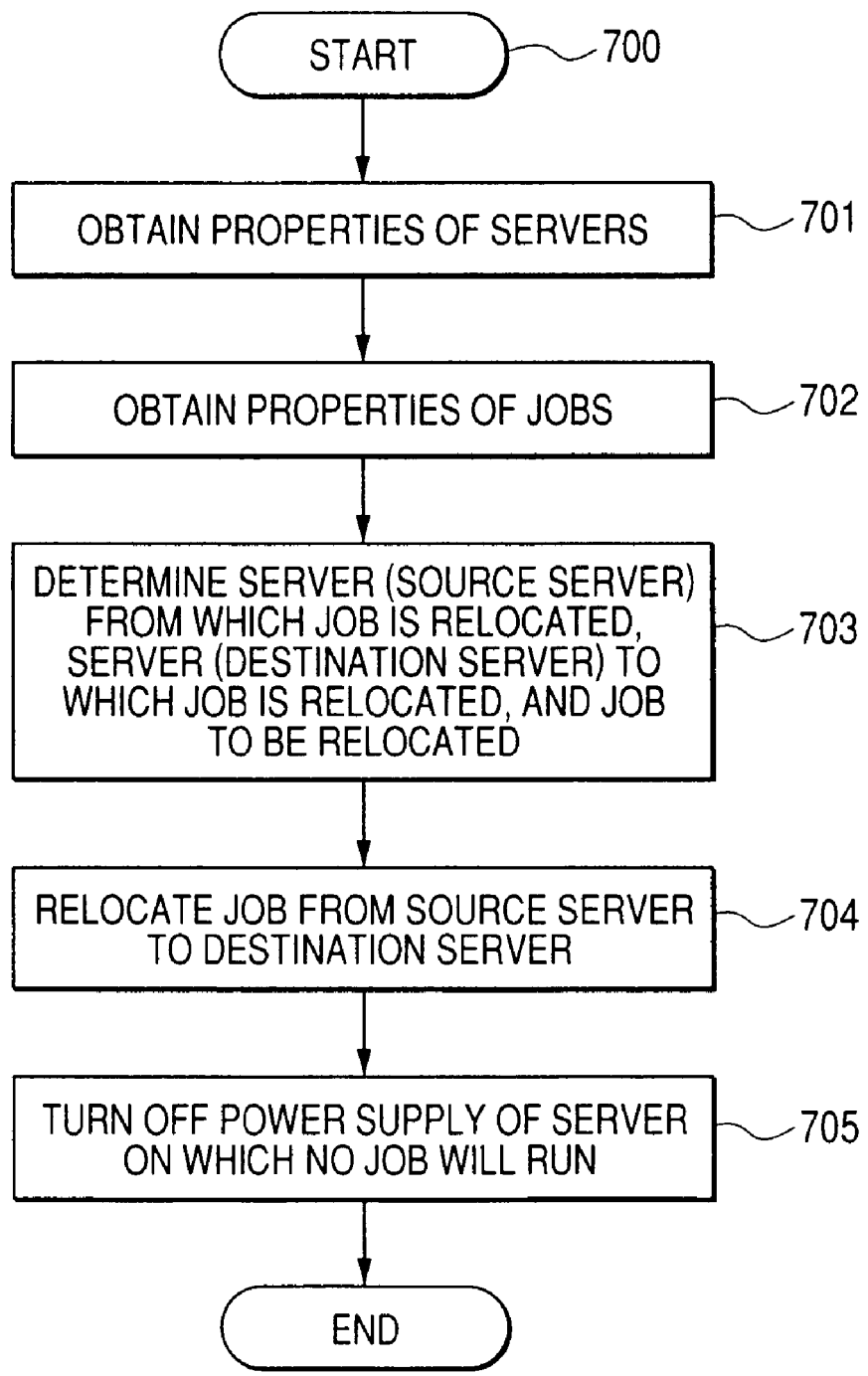
FIG. 7 shows a flowchart of operation of the first embodiment.

FIG. 7 shows a general operation flow of the first embodiment. The start (700) of this operation flow (procedure) may be triggered by addition and removal of a server to/from the computing system, addition and removal or completion of a job, change in a server configuration, change in the contents of a job or performance requirements for a job, change in the power supply environment of a server such as connection to Uninterruptible Power Supply (UPS), electricity expense, and stable distribution of power, and start request from a user. This procedure may be triggered by building a new computing system like initial installation or transition from a test environment to an actual operation environment. Further, this procedure may be executed periodically. Step 701 is to obtain the identifiers of the servers 111-114 constituting the computing system, the performance values of the servers, and the power consumptions to attain the performance values. Step 702 is to obtain the identifiers of the jobs that run in the computing system and the identifiers of the servers running the jobs, respectively, and performance requirements for each job to meet the Service Level Agreement (SLA).

Step 703 is to determine among the servers 111-114 constituting the computing system a source server from which and a destination server to which a job is relocated and a job to be relocated, according to the condition for relocation that more jobs shall be allocated to a server with a smallest or smaller value of power consumption per unit of performance to the extent that performance requirements for each job are fulfilled, thus maximizing the number of servers on which no job is running, as will be further detailed later. Here, the job to be relocated resides on the source server. However, no source server may exist, if the job to be relocated is not running. Step 704 is to relocate the job determined to be relocated from the source server to the destination server. Here, if no source server exists, then the job is added to the destination server. Step 705 is to look for a server on which no job will run and, if there is such a server, to turn off the power supply of that server. However, no action will occur if the power supply of that server is already off. In the following, details of each step of the procedure of FIG. 7 will be described.

Figure 8:
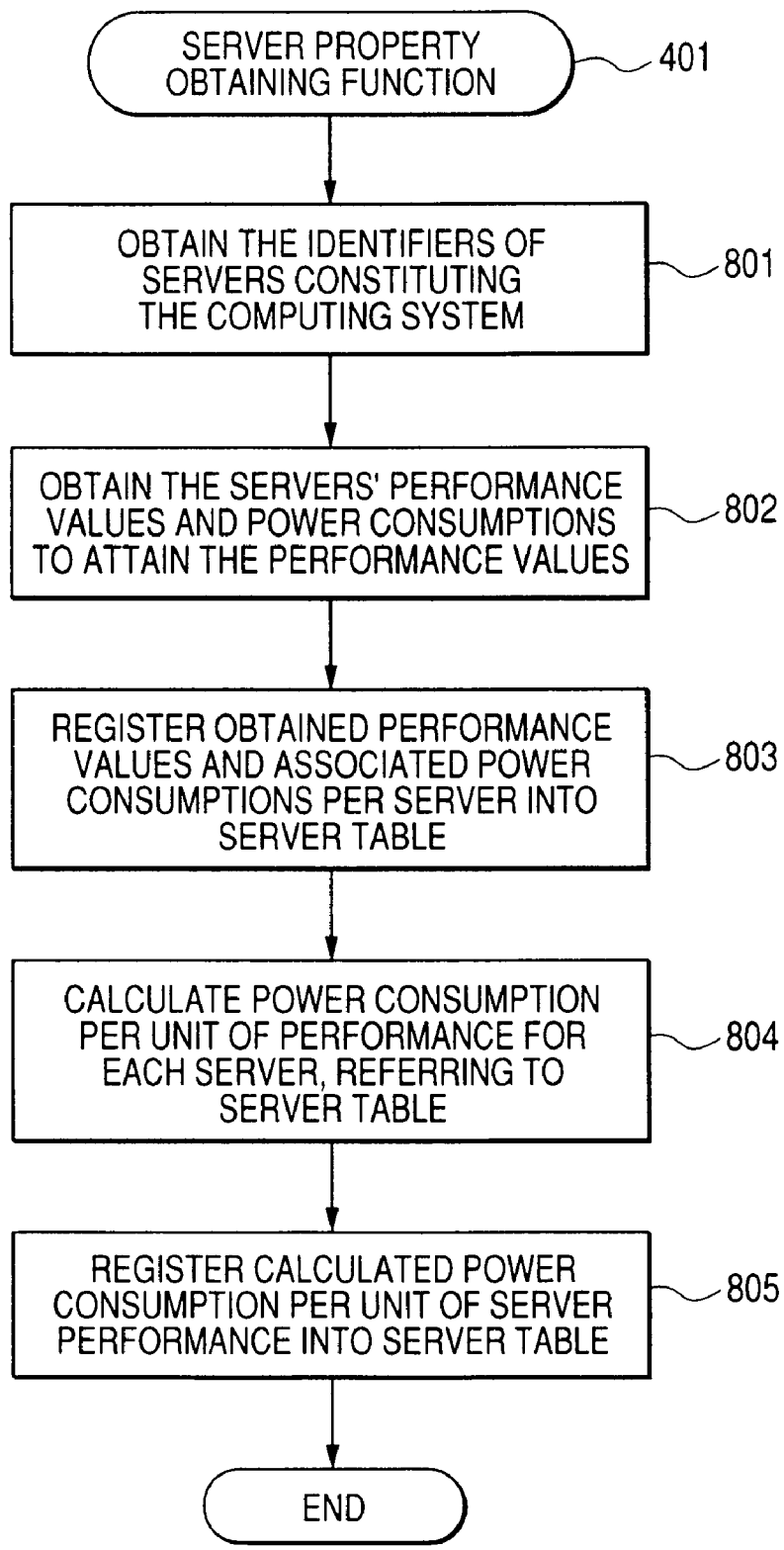
FIG. 8 shows a sub-flowchart of a server properties obtaining function in the first embodiment.

FIG. 8 illustrates details of step 701 as mentioned in FIG. 7. Step 701 in FIG. 7 corresponds to the server properties obtaining function 401 as mentioned in FIG. 4. Now, step 801 is to obtain the identifiers of the servers 111-114 constituting the computing system and know the number of the servers constituting the computing system. Step 802 is to obtain the servers' performance values and the servers' power consumptions to attain the performance values. The performance values and power consumptions to be obtained are peak performance values and the power consumptions at the time and may include other permanence values and associated power consumptions. However, the peak performance values and associated power consumptions must be obtained. The power consumption of a server includes, in addition to the power consumed by the server's CPU, the power consumed by the components of the server including the memory, chip set, I/O device, NIC, cooling device, power supply device, auxiliary storage device, BMC, etc. Further, the power consumption fractions for each component of the server, namely, the memory, chip set, I/O device, NIC, cooling device, power supply device, auxiliary storage device, BMC, etc. may be obtained. There are possible methods of obtaining the servers' properties. The servers' properties may be entered by a user by means of a Graphical User Interface (GUI) provided by the power reduction facility 110 or using command lines (CUI), may be retrieved from a file stored in a storage device (not shown) connected to the supervisory server 101, and may be acquired via a network.

Step 803 is to register the information related to performance and power consumption obtained at step 802 into the server table 410. As a result, the peak performance value and associated power consumption of each server must be stored in the server table 410, 410A. Step 804 is to calculate power consumption per unit of performance of each server, referring to the information registered in the server table 410. Here, a method of calculation is to divide the power consumption at the time of a performance value by the performance value, thus obtaining the amount of power consumption per unit of performance. However, other than this method, a method for obtaining the power consumption efficiency of a server quantitatively may be used. Step 805 is to add the calculated power consumption per unit of performance of each server to the server table 410 in a new column on the corresponding line. This will be described later.

Figure 9:
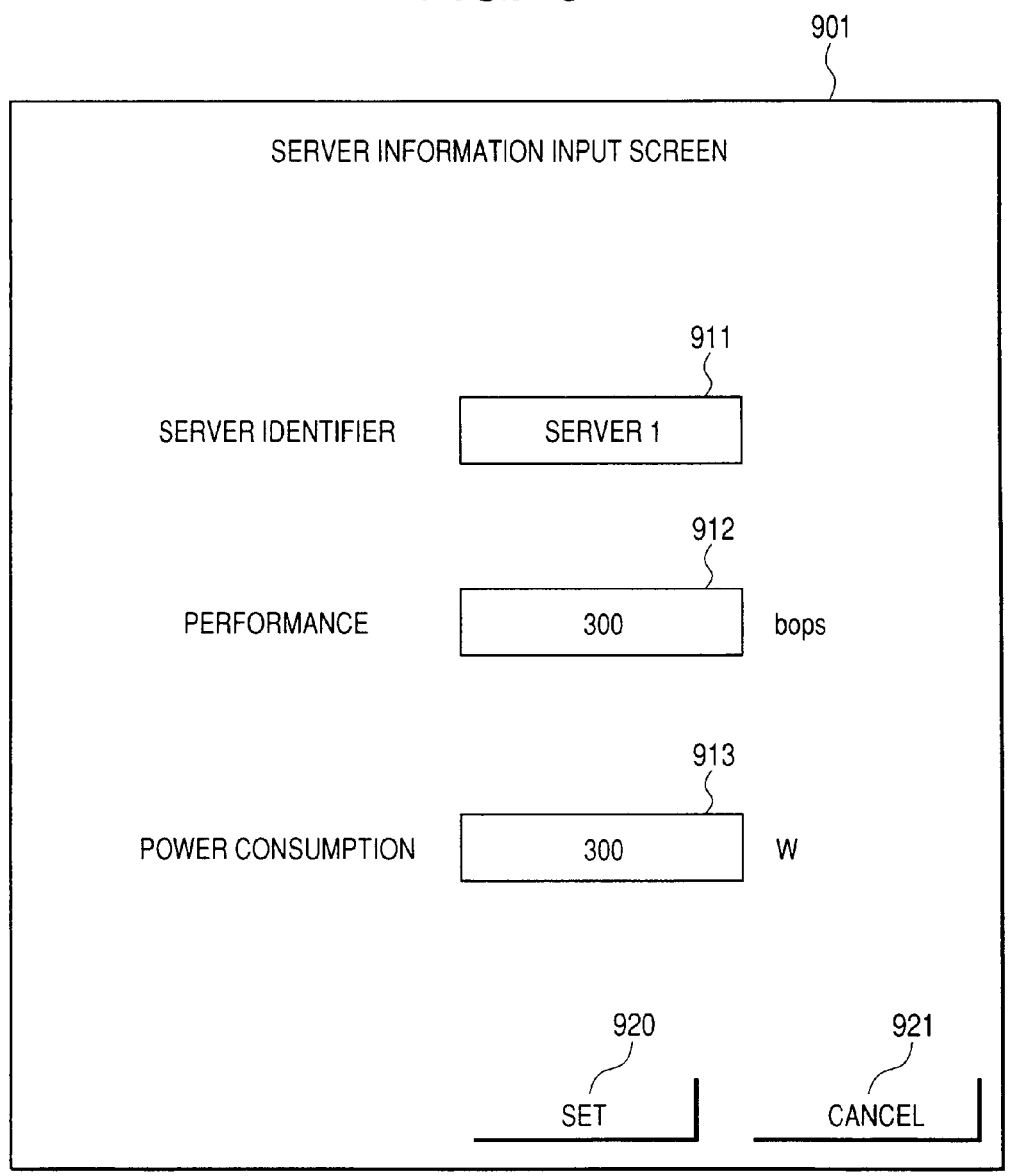
FIG. 9 illustrates a server information input screen in the first embodiment.

FIG. 9 shows an example of the GUI by which the user enters the performance and associated power consumption of each server, as described for steps 801 and 802 in FIG. 8. The power reduction facility 110 displays this GUI on the display device 306 as mentioned in FIG. 3, using a browser or a special program and in text form, etc. In fields 911, 912, 913 shown in the figure, a value can be entered. Using the keyboard or the like, the user will enter the identifier of a server in the first field 911, and in the second field 912, a performance value of the server entered in the first field 911, and in the third field 913, power consumption associated with the performance entered in the second field 912. After the entry, by user action such as choosing and clicking on a Set button with the mouse, the information entered to the GUI is sent to the server properties obtaining function 401.

FIG. 10 shows an example a server table 410A to which the power consumption per unit of performance of each server was added, as described for step 805 in FIG. 8. The power consumption per unit of performance of each server is entered in a fourth column 504. A value in the fourth column 504 indicates the power consumption per unit of performance, when the server identified in the first column 501 operates at the performance value given in the second column 502, consuming the power given in the third column 503. In the present embodiment, a smaller value in the fourth column 504 denotes better power consumption efficiency.

Figure 11:
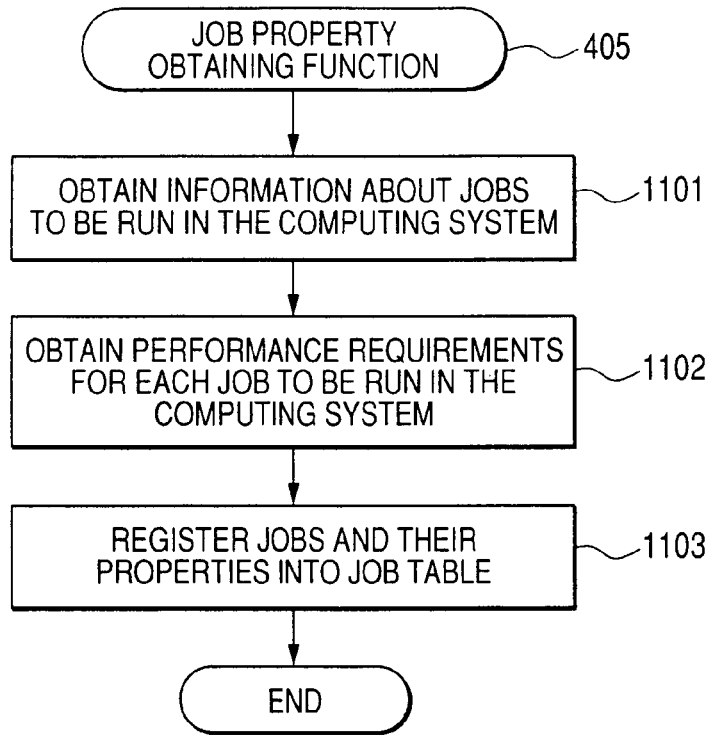
FIG. 11 shows a sub-flowchart of a job properties obtaining function 405 in the first embodiment.

FIG. 11 illustrates details of step 702 as mentioned in FIG. 7. Step 702 in FIG. 7 corresponds to the job properties obtaining function 405. Step 1101 is to obtain information for the jobs to be run in the computer system and know the type(s) and the number of the jobs to be run in the computing system. Step 1102 is to obtain performance requirements for the jobs obtained at step 1101. At these steps 1101 and 1102, the jobs' properties may be obtained in different ways; for example, they may be entered by a user by means of the GUI provided by the power reduction facility 110 or using command lines, may be retrieved from a file stored in a storage device (not shown) connected to the supervisory server 101, and may be acquired via a network. For the performance requirements to be obtained, for example, the number of instructions of a job executed per unit time or throughput of processing Web requests, transaction requests and I/O requests to a job may be obtained and converted to a value such as Billions of Operations Per Second (bops) representing the CPU performance. Step 1103 is to register the jobs and jobs' properties obtained at steps 1101 and 1102 into the job table 411.

Figure 12:
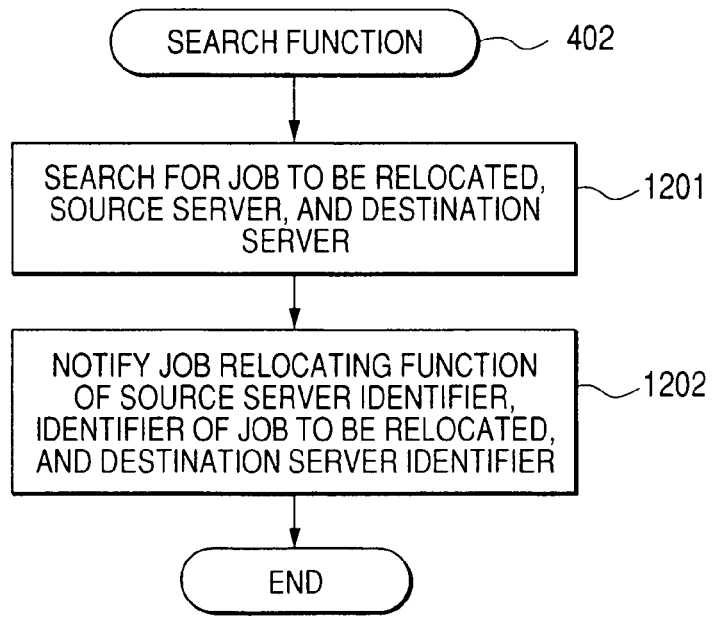
FIG. 12 shows a sub-flowchart of a search function 402 in the first embodiment.

FIG. 12 illustrates details of step 703 as mentioned in FIG. 7. Step 703 in FIG. 7 corresponds to the search function 402. Step 1201 is to search among all jobs for a job to be relocated and search for the source server from which and the destination server to which the job is relocated. In the present invention, the search at this step 1201 is performed, according to the condition for relocation that more jobs shall be allocated to a server with a smallest or smaller value of power consumption per unit of performance to the extent that performance requirements for each job are fulfilled, thus maximizing the number of servers on which no job is running. This intensive allocation of jobs to a subset of the servers is realized by job relocation. Here, the power consumption per unit of performance can be obtained by reference to the server table 410A shown in FIG. 10. The performance requirements for each job can be obtained by reference to the job table 411 shown in FIG. 6. In the present embodiment, to determine whether or not more jobs can intensively be allocated to a server to the extent that performance requirements for each job are fulfilled, the peak performance of each server is obtained from the server table 410. If the sum of the performance requirements for all jobs to be run on the server does not exceed the peak performance of the server, the intensive allocation of the jobs to the server is allowed. If the sum exceeds the peak performance, the intensive allocation of the jobs to the server is not allowed. Also in the present embodiment, to maximize the number of servers on which no job is running, all jobs running on a server with a high value as the power consumption per unit of performance should be candidates to be relocated preferentially.

If a job is not running, there is no source server. A plurality of sets of a job to be relocated, the source server, and the destination server may be determined as the result of the search at step 1201. Step 1202 is to notify the job relocating function 403 of the destination server identifier, the identifier of the job to be relocated, the identifier of the source server, if such a source server exists, obtained at step 1201. This function 403 will be detailed, using FIG. 13. If there are a plurality of sets of the destination server identifier, the identifier of the job to be relocated, and the source server identifier, obtained at step 1201, step 1202 is to notify the job relocating function 403 of all the sets. If it is found at step 1201 that the whole computing system performance is not enough to meet the performance requirements for all jobs, the search function may signal this situation to a function that automatically adds resources to the computing system or present a warning on the display device 306 of the supervisory server 101. Additionally, the search at step 1201 may be conditioned in terms of stability of power distribution of the source server and the destination server and electricity expenses per server and the search may be performed to allocate more jobs to a server to which power is distributed stably and costing less electricity expense. In the present embodiment, however, it is needed to satisfy the condition that more jobs are allocated to a server to the extent that performance requirements for each job are fulfilled.

Figure 13:
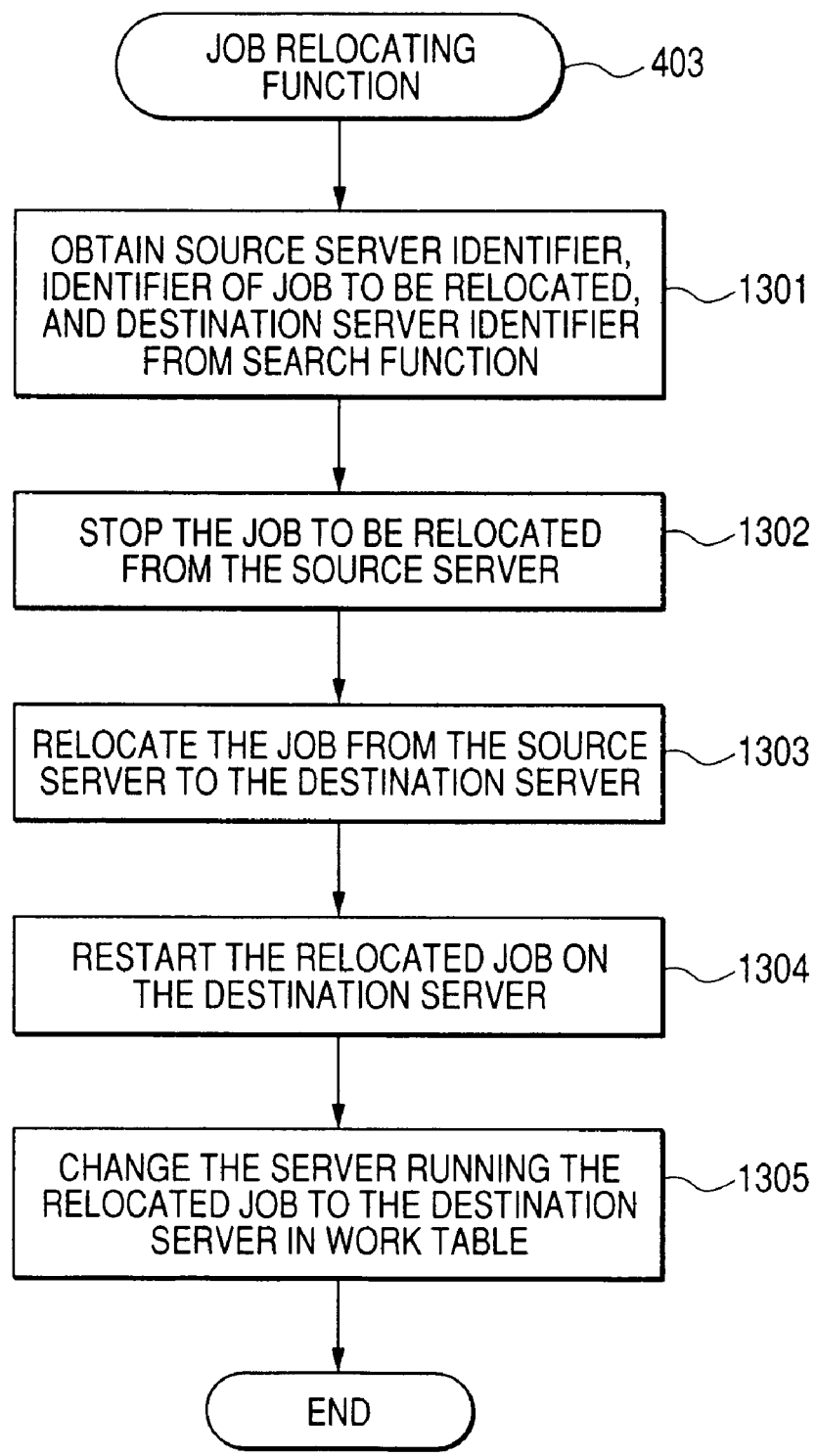
FIG. 13 shows a sub-flowchart of a job relocating function 403 in the first embodiment.

FIG. 13 illustrates details of step 704 as mentioned in FIG. 7. Step 703 in FIG. 7 corresponds to the job relocating function 403. Step 1301 is to obtain the source server identifier, the identifier of the job to be relocated, and the destination server identifier from the search function 402. Here, this step may not obtain the source server identifier, if no source server identifier exists. Step 1302 is to stop the job to be relocated on the source server, if the source server exits. However, if a technique that enables relocation of a job without stopping the job to be relocated, it is not needed to perform step 1302. As the technique enabling seamless job relocation, for example, a function "Live migration" provided by Xen open source software and Vmotion provided by VirtualCenter software supplied from VMware, Inc. may be available. Also, in the case where no source server exists, it is not needed to perform step 1302. Step 1303 is to relocate the job from the source server to the destination server.

There are possible methods of relocation of a job, including copying the image of the job program from the source server to the destination server, pre-storing of the image of the job program on both the source server and the destination server, and sharing the image of the same job program by the source server and the destination server. Here, the image of the job program is a combination of a program and its associated data. The program may be any of the types, for example, OS, middleware, application, driver, etc. If no source server exists, the supervisory server 101 may be regarded as the source server or a method may be used for distributing the image of the job program to the destination serve, using job program image distribution software or the like. Step 1304 is to restart the relocated job on the destination server. Step 1305 is to change the server running the relocated job to the destination server in the second column 602 in the job table 411 of FIG. 6. If a plurality of sets of the source server, destination server, and the job to be relocated are received at step 1301, the subsequent steps 1302 to 1305 are repeated as many times as the number of the sets received at step 1301.

Figure 14:
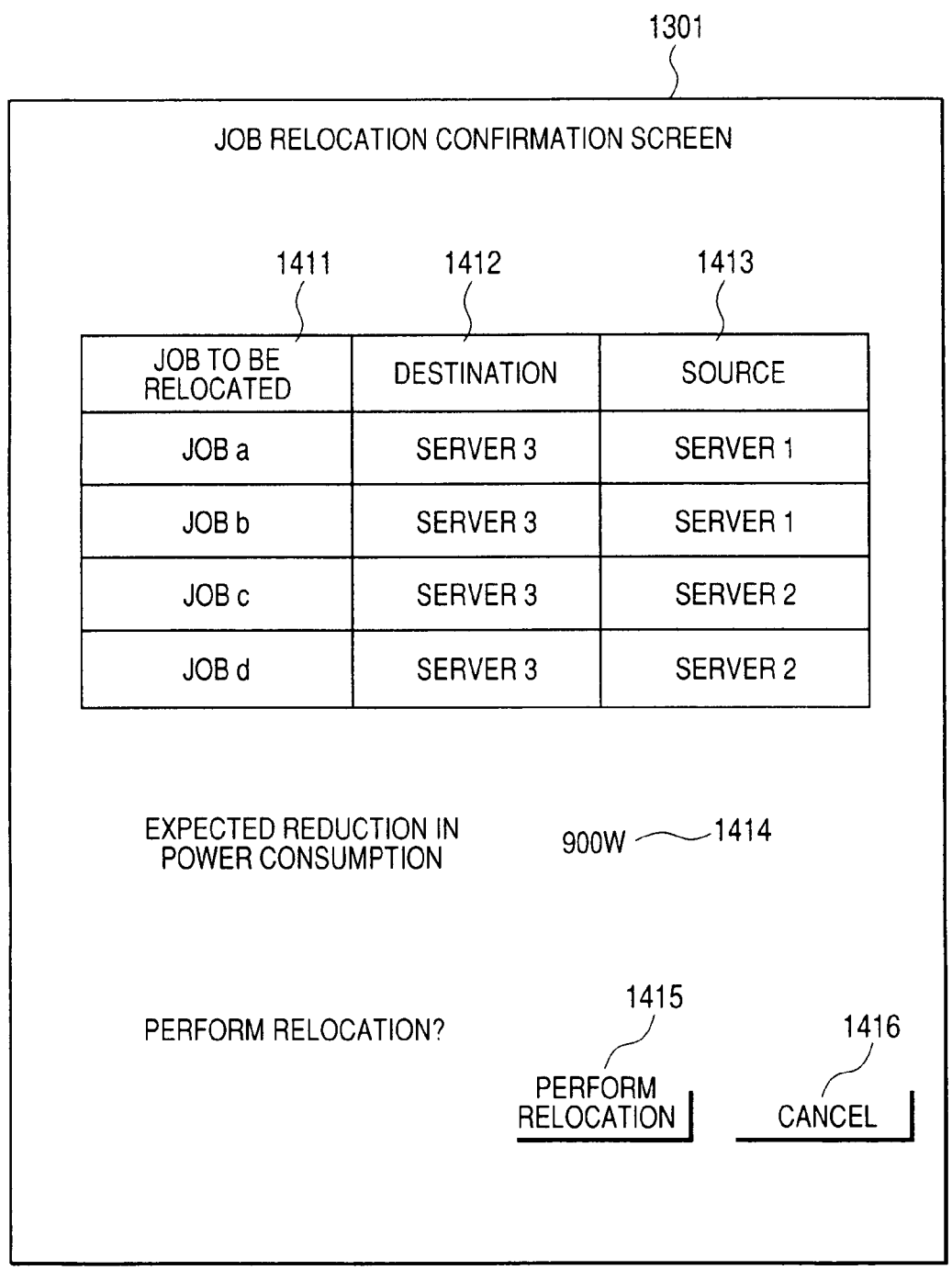
FIG. 14 illustrates a job relocation confirmation screen 1301 in the first embodiment.

FIG. 14 is an example of GUI display prompting the user to confirm job relocation before the job relocating function 403 relocates the jobs before starting the job relocation. The GUI displays a screen 1401 shown here on the display device 306 as mentioned in FIG. 3, using a browser or a special program and in text form, etc., thereby asking the user whether or not to perform job relocation before starting the job relocation. A first column 1411 lists the identifiers of the jobs to be relocated. A second column 1412 lists the identifiers of the destination servers to which the jobs listed in the first column are relocated. A third column 1413 lists the identifiers of the servers that currently run the jobs listed in the first column 1411. If a job given in the first column 1411 is not running, the corresponding field in the third column 1413 will be empty. A value 1414 of power indicates the expected power that can be cut after the execution of the job relocation. The expected value of the power that can be cut may be fractionized into those per server and per job. If the user performs the relocation, by choosing and clicking on the "Do Relocation" button 1415 with the mouse, then the job relocating function 403 is executed. If the user cancels the job relocation, click on the "Cancel" button 1416 with the mouse. The GUI screen for the present embodiment is, for example, shown for an instance where a plurality of jobs are relocated at a time, whereas a single job may be relocated. On this GUI screen, the remaining margins of performance capacity for each server and for the whole computing system may be shown.

Figure 15:
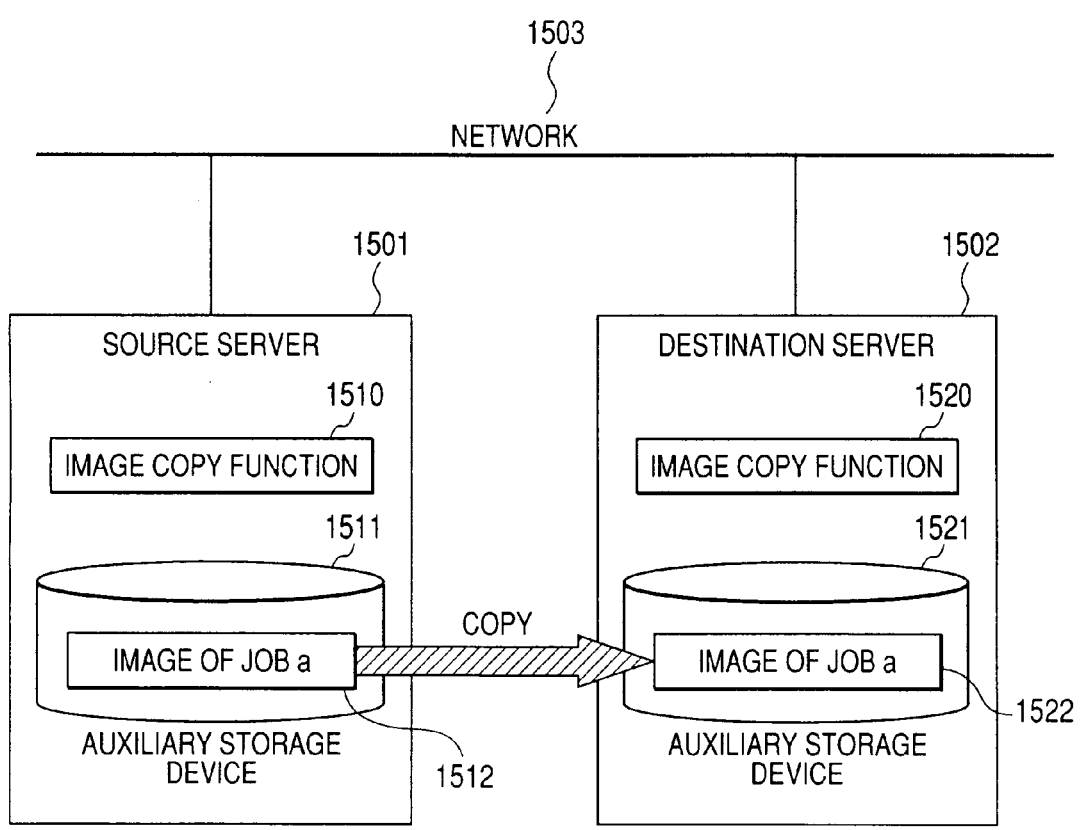
FIG. 15 shows a schematic diagram explaining an example of a job relocation method in the first embodiment.

FIG. 15 shows an example of a job relocation method in step 1303 in FIG. 13. On the source server 1501 and the destination server 1502, image copy functions 1510, 1520 for copying the contents of the auxiliary storage device are activated. The image copy functions 1510, 1520 may be implemented by, for example, a ftp command, a rcp command, or an agent program for copy. The image 1502 of the job program on the source server is copied to the auxiliary storage device of the destination server 1502 via the image copy functions 1510, 1520. Thereby, the job can be run on the destination server. A data disk or the like required by the job may be shared using an external storage device.

Figure 16:
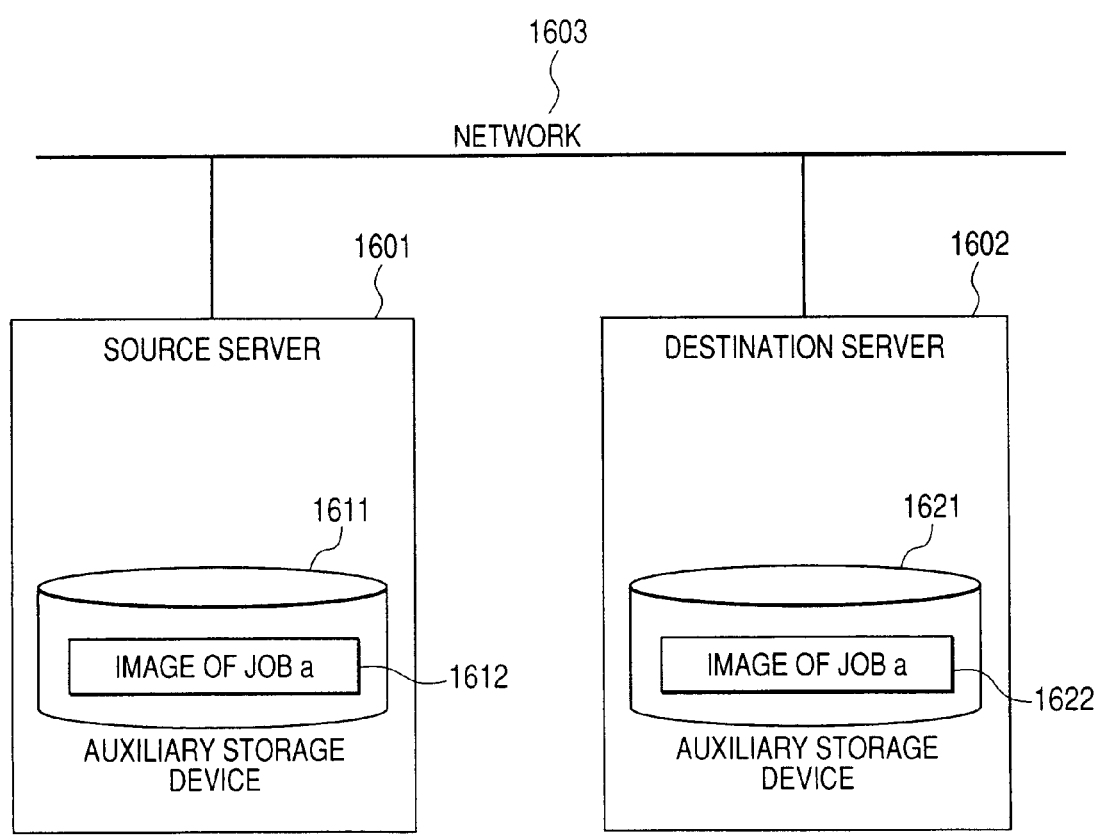
FIG. 16 shows a schematic diagram explaining another example of a job relocation method in the first embodiment.

FIG. 16 shows another example of a job relocation method in step 1303 in FIG. 13. In this method, images of the same job program 1612, 1622 are pre-stored in the auxiliary storage devices 1611, 1621 of both the source server 1601 and the destination server 1602.

Figure 17:
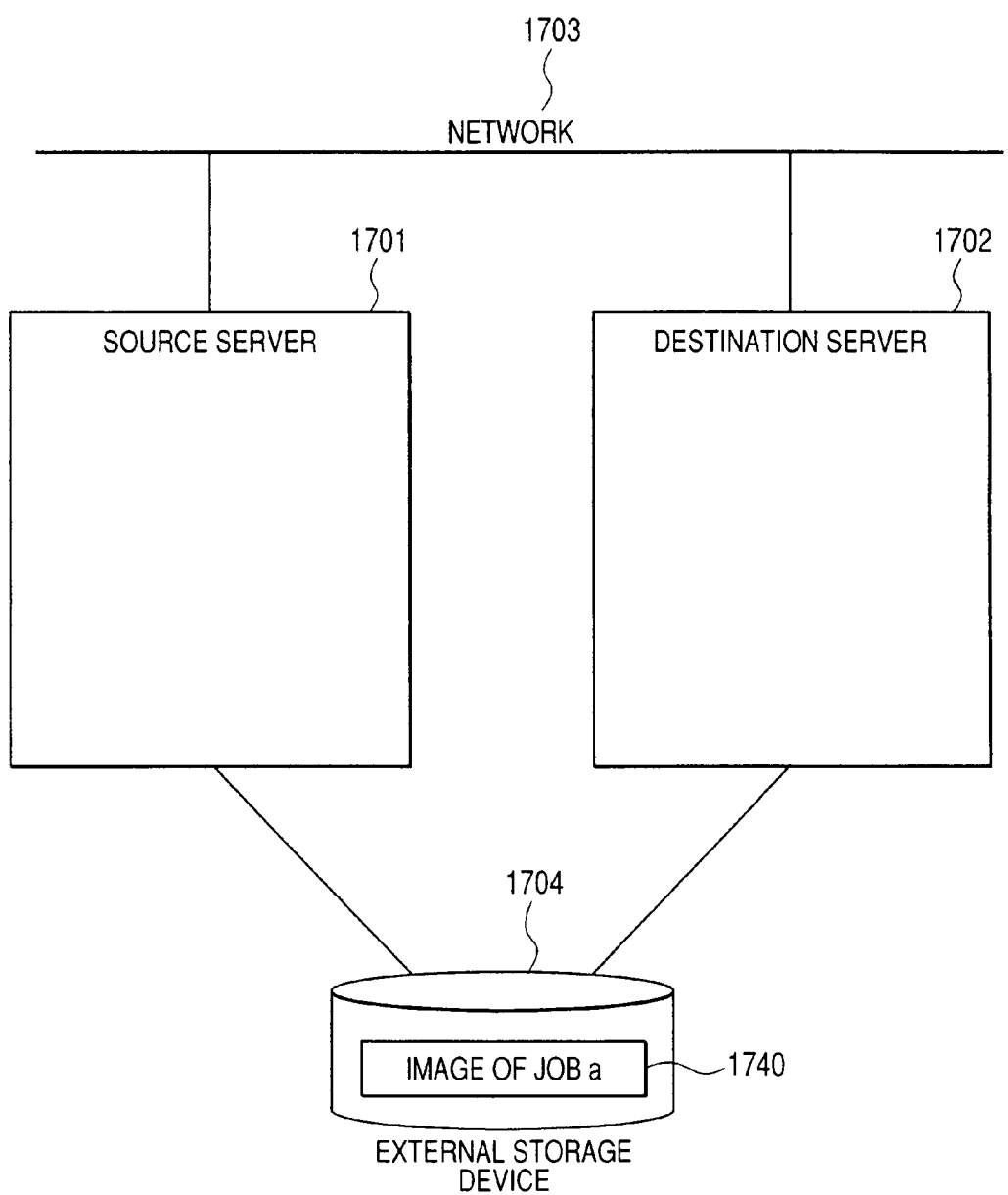
FIG. 17 shows a schematic diagram explaining another example of a job relocation method in the first embodiment.

FIG. 17 shows another example of a job relocation method in step 1303 in FIG. 13. In this method, the source server 1701 and the destination server 1702 can refer to the same image of the job program 1740 stored in an external storage device 1704.

Figure 18:
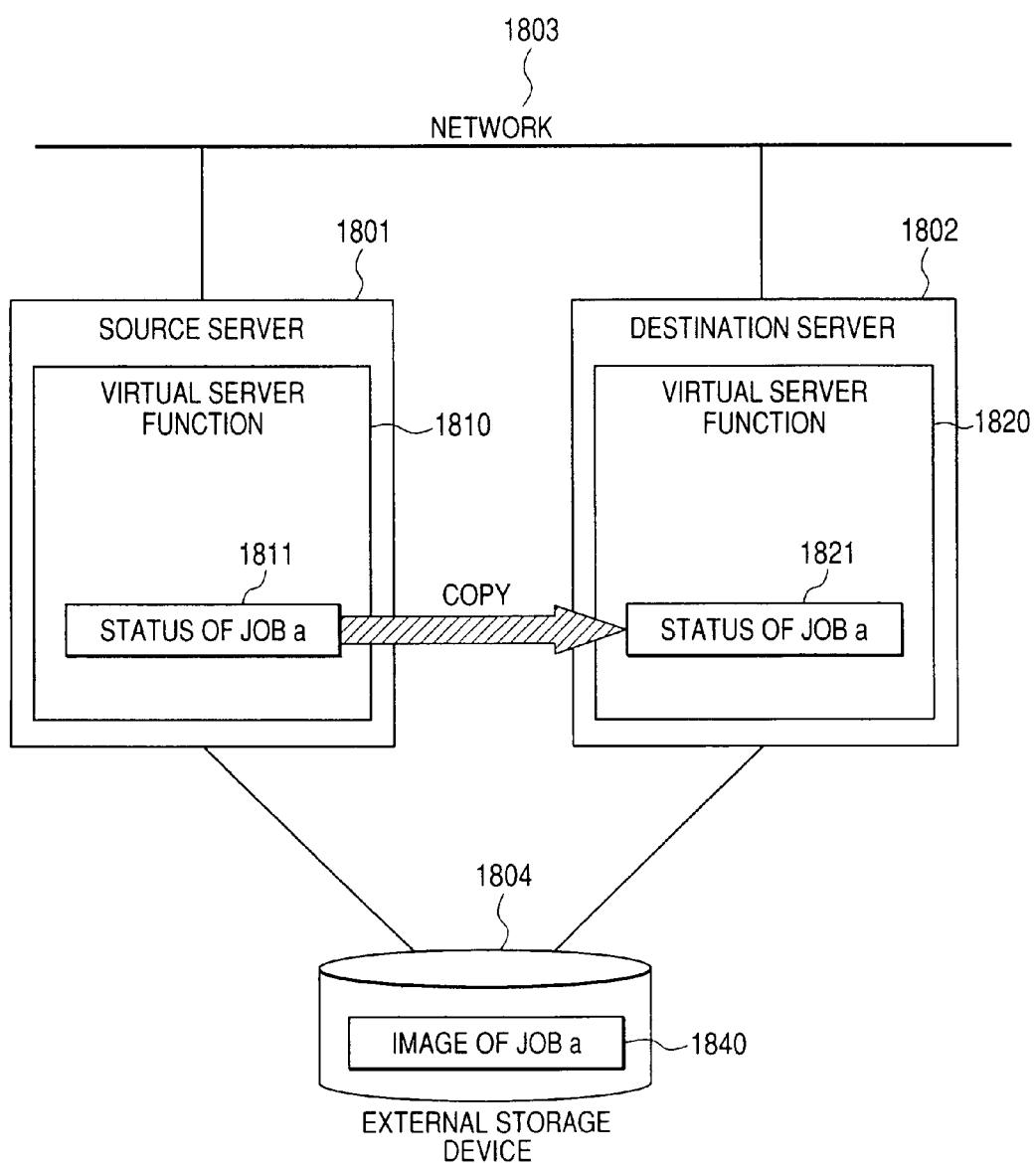
FIG. 18 shows a schematic diagram explaining another example of a job relocation method in the first embodiment.

FIG. 18 shows another example of a job relocation method in step 1303 in FIG. 13. This method is to relocate a job, when jobs are run on virtual servers realized by virtual server functions 1810, 1820 of Xen open-source software, VMware registered trademark) from VMware, Inc., and the like. The image 1840 of the job is held in an external storage device 1804 which is shared by the source server 1801 and the destination server 1802. The virtual server function 1810 being run on the source server 1801 holds the job status 1811. Here, the job status is the information that is temporarily retained on the memory of the server during the run of the program such as OS, middleware, driver, and application on the server. In the example of FIG. 18, when the job is relocated from the source server 1801 to the destination server 1802, the job status 1811 on the source is copied to the destination server 1802 through the network 1803. Thereby, the destination server 1802 can restart the relocated job promptly. The job image 1840 may be shared by the source server 1801 and the destination server 1802 via the network without using the external storage device 1804.

Figure 19:
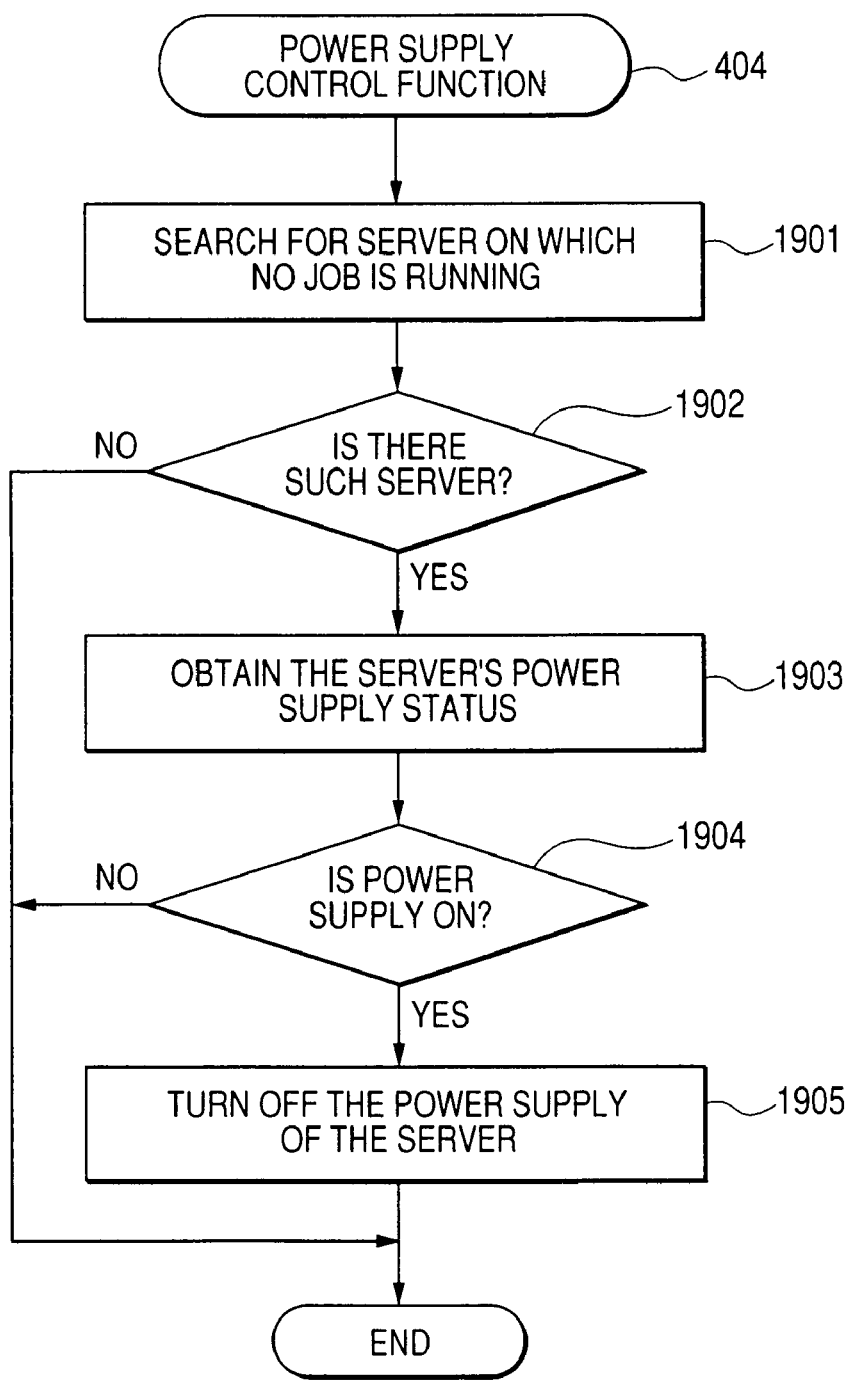
FIG. 19 shows a sub-flowchart of a server power supply control function 405 in the first embodiment.

FIG. 19 shows details of step 705 as mentioned in FIG. 7. Step 705 in FIG. 7 corresponds to the flow of the server power supply control function 404. Step 1901 is to search for a server on which no job is running in the computing system, using the server table 410 and the job table 411. At step 1902, if a server on which no job is running is found as the result of step 1901, the procedure proceeds to step 1903; if such server does not exist, the procedure terminates. Step 1903 is to obtain the power supply status of the server. Here, the server's power supply status may be obtained from a server management module such as BMC built in the server or an agent running on the server. At step 1904, if the server's power supply is on as the result of step 1903, the procedure proceeds to step 1905; otherwise, the procedure terminates. If a plurality of servers on which no job is running are found at step 1901, the subsequent steps 1902 to 1904 are repeated as many times as the number of the servers found at step 1901. Step 1905 is to turn off the power supply of the server found to be on as the result of step 1903. Here, the server's power supply may be turned off by requesting the BMC built in the server to turn off the power supply or requesting the agent running on the server to shut down the power. Step 1905 may issue an instruction to put the server in standby mode and transfer the information existing in the server memory to the auxiliary storage device temporarily, instead of turning off the power supply, thus allowing for faster recovery from standby mode when the server's power supply is turned on.

For reducing the power consumption of the computing system, the method of the present embodiment searches among all jobs for a job to be relocated and searches for the source server from which and the destination server to which the job is relocated, according to the condition for relocation that more jobs shall be allocated to a server with a smallest or smaller value of power consumption per unit of performance to the extent that performance requirements for each job are fulfilled, thus maximizing the number of servers on which no job is running. By this relocation of jobs, it is possible to minimize the power to be consumed, while complying with the SLA of the system.

Embodiment 2

A second embodiment (Embodiment 2) of the present invention is a method for intensive allocation of jobs to a subset of the servers, based on an event triggering the power reduction procedure by the power reduction facility 110 in Embodiment 1. A combination of the second embodiment and any other embodiment can be regarded as one embodiment of the present invention.

Figure 20:
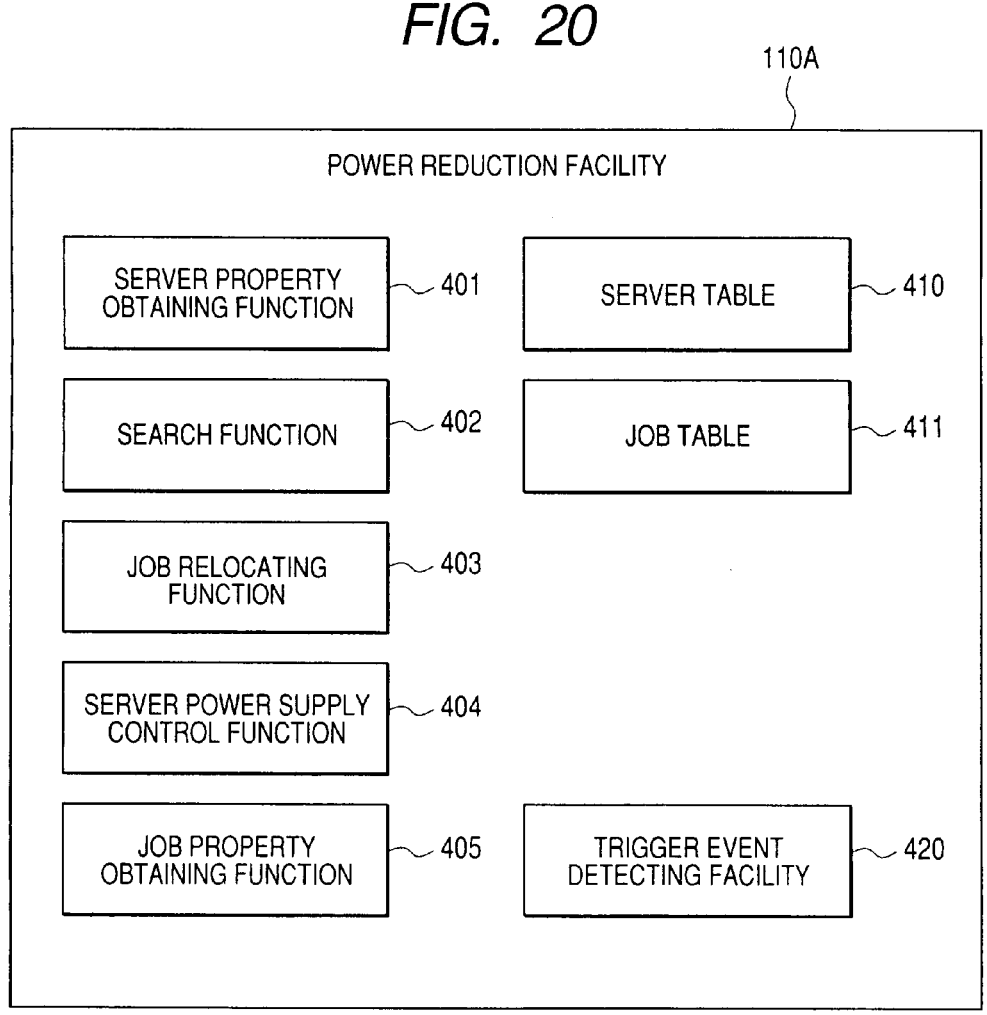
FIG. 20 shows a structural diagram of the power reduction facility in a second embodiment of the invention.

FIG. 20 shows details of the power reduction facility 110A in the second embodiment. Difference from Embodiment 1 lies in that the power reduction facility is provided with a trigger event detecting facility 420 which detects what event triggers the procedure of the invention illustrated in FIG. 7 in Embodiment 1. The trigger event detecting facility 420 detects one of the trigger events as will be specified below and starts the procedure illustrated in FIG. 7 in Embodiment 1. The trigger events are addition and removal of a server to/from the computing system; addition and removal or completion of a job, change in a server configuration; change in the contents of a job or performance requirements for a job; change in the power supply environment of a server such as connection to UPS, electricity expense, and stable distribution of power; start request from a user; and an event that the power consumed by each of the servers constituting the computing system or the power consumed by the whole computing system has exceeded or is below a predefined amount of power consumption. The trigger event detecting facility 420 can notify each function of the power reduction facility 110A of the type of the trigger event detected. If the trigger event is addition of a server to the computing system or addition of a job, information for the added server or job will be added to the server table 410 or the job table 411 by the server properties obtaining function 401 or the jobs properties obtaining function 405. On an event of deletion of a server from the computing system, an event of deletion of a job, and an event of change in a server configuration or the contents of a job, the change occurring will be reflected in the server table 410 and the job table 411. This reflection may be performed automatically by the trigger event detecting facility 420 or by some other method.

Embodiment 3

A third embodiment (Embodiment 3) of the present invention is a method of obtaining server power properties from a power property measuring function installed in each server in the server properties obtaining function in Embodiment 1. A combination of the third embodiment and any other embodiment can be regarded as one embodiment of the present invention.

Figure 21:
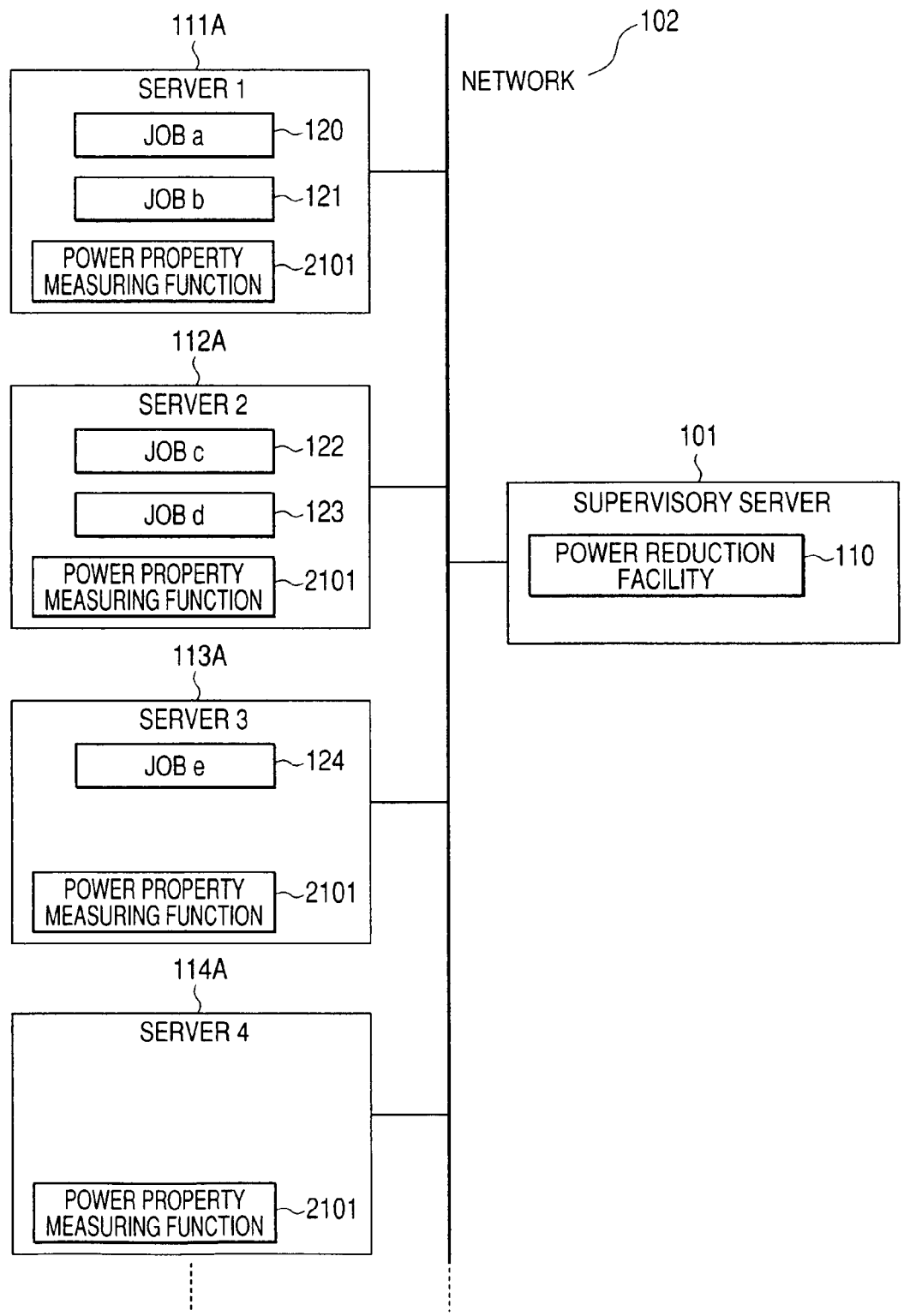
FIG. 21 shows an overall structural diagram of a computing system according to a third embodiment of the invention.

FIG. 21 shows an overall structural diagram of the computing system in Embodiment 3. Difference from Embodiment 1 lies in that each server 111A-114A is provided with a power property measuring function 2101. The power property measuring function 2101 can measure performance that the server utilizes (utilization performance) and the amount of power consumed by the whole server at the time as well as the amount of power consumed by each of its components and can report its measurement values to the power reduction facility 110.

Figure 22:
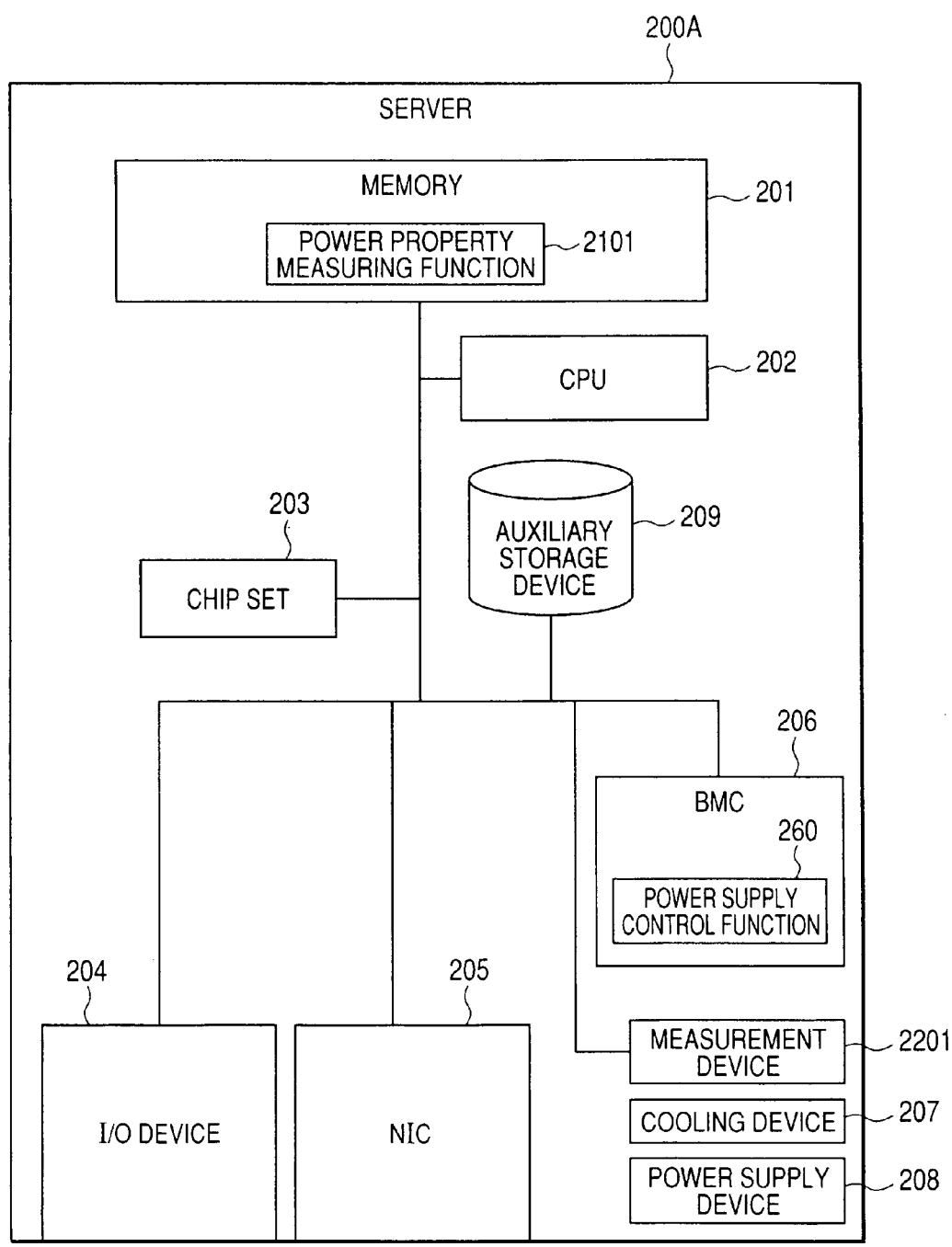
FIG. 22 shows a structural diagram of a server 200A in the third embodiment.

FIG. 22 shows a detailed structure of each server 111A-114A in the third embodiment, wherein each server is represented as a server 200A. Difference from Embodiment 1 lies in that the server is provided with a measurement device 2201 and the power property measuring function 2101. The measurement device 2201 is able to measure the amount of power consumed by the whole server 200A and the amount of power consumed by each component and report the results to the power property measuring function 2101. Here, the amount of power consumed by each component is the amount of power consumed separately by the memory 201, CPU 202, chip set 203, I/O device 204, NIC 205, BMC 206, cooling device 207, power supply device 208, and auxiliary storage device 209, which constitute the server.

Figure 23:
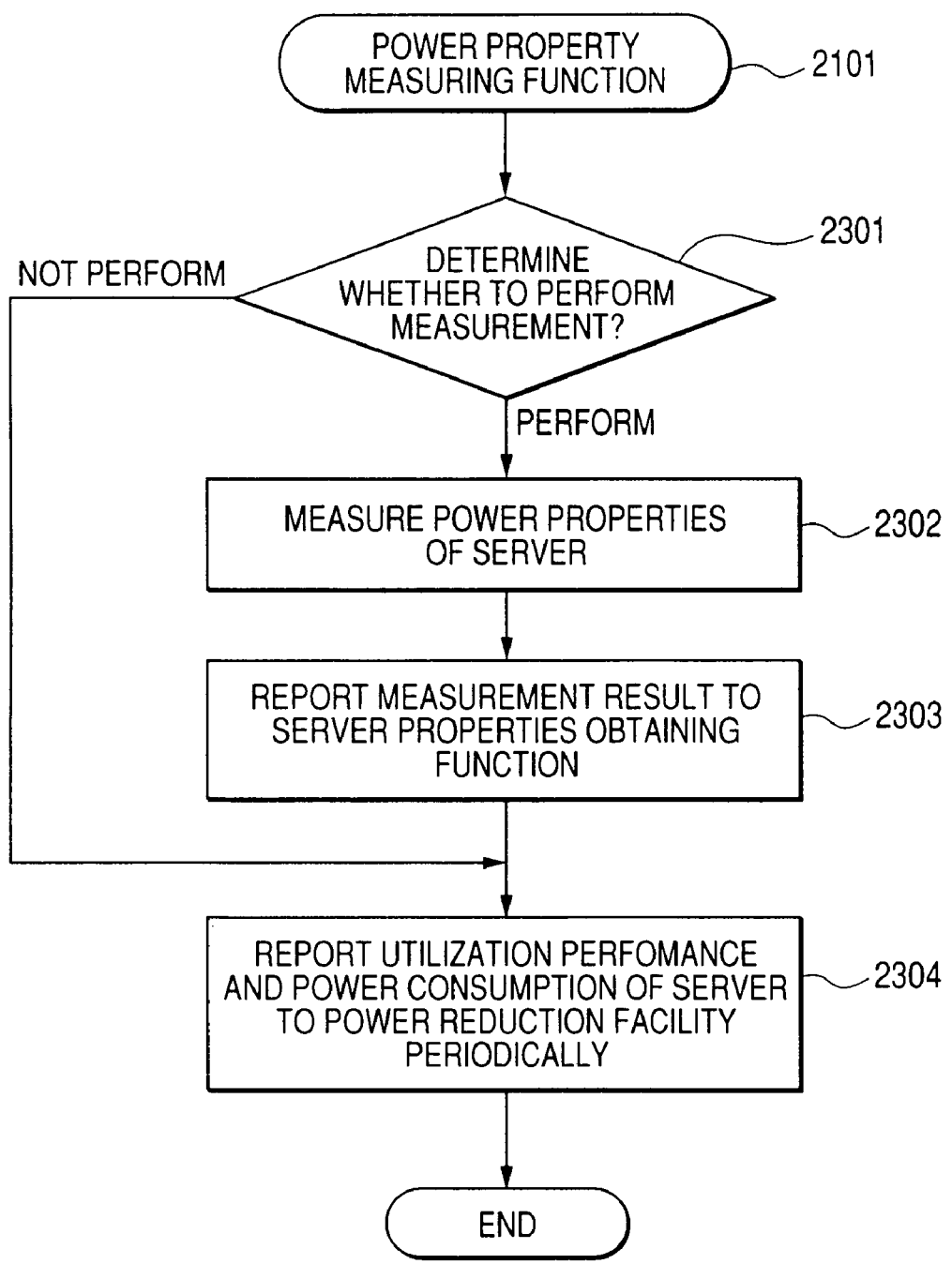
FIG. 23 shows a sub-flowchart of a power property measuring function 2101 in the third embodiment.

FIG. 23 shows an operation flow (procedure) of the power property measuring function 2101. This procedure is performed as a means for obtaining server performance and power consumption at the time in step 802 of the procedure performed by the server properties obtaining function 401, shown in FIG. 8 in Embodiment 1. Step 2301 is to determine whether or not to perform the measurement of server power properties. At this decision, if a server is the one whose power properties have never been measured, the procedure proceeds to step 2302 to perform the measurement. If the power properties of the server have been measured, the procedure proceeds to step 2304 without performing the measurement. However, in the case where the server configuration has been changed by, for example, adding a device to the server, the procedure proceeds to step 2302 to execute the measurement of the server power properties again. Step 2302 is to perform the measurement of the server power properties. Here, the power property measuring function itself has a mechanism to apply varying load to the server. While this mechanism gradually changes the computational amount from low to high to gradually increase the utilization performance of the server up to the peak performance, the amount of power consumption depending on the utilization performance is measured by the measurement device. Based on the measurements, the power property measuring function creates a power properties list indicating the server performance and the power consumption characteristic depending on the performance. Here, during a job run on the server, that is, when a program producing a load is running, the program may be automatically terminated or shut down and restarted after the measurement or may be terminated manually by the user. In the latter case, a message may be displayed on the GUI. Step 2303 is to report the power properties list created at step 2302 to the server properties obtaining function 401. Step 2304 is to measure the server utilization performance and power consumption periodically and repeat the reporting to the power reduction facility 110. However, in the present embodiment, step 2304 may not be performed.

FIG. 24 shows an example of a server table 410B in the third embodiment. While the examples of the server tables 410 410A shown in Embodiment 1 list only the peak performance values and associated power consumptions of the servers, performance values other than the peak and associated power consumptions are added to the server table 410B in the third embodiment. When a server is on standby with a performance value of 0, the power consumption per unit of performance is empty, as it cannot be measured. In the present embodiment, the search function 402 can obtain power consumptions per unit of performance for utilization performance values other than the peak of each server, referring to the server table 410B. Thus, it can obtain the power consumption per unit of performance for a utilization performance value corresponding to the sum of the performance requirements for all jobs running on the server. Using this value, the search function 402 can search for one or more sets of a job to be relocated, its source server and destination server, so that the power consumption of the whole computing system can be reduced.

By obtaining the power consumed by each server or the power consumed by the whole computing system utilizing the power property measuring function 2101 in the third embodiment, the trigger event detecting facility 420 as described in Embodiment 2 can determines whether or not the power consumed by each of the servers constituting the computing system or the power consumed by the whole computing system has exceeded or is less than the predefined amount of power consumption.

Embodiment 4

A fourth embodiment (Embodiment 4) of the present invention is a method in which the job properties obtaining function in Embodiment 1 obtains the load variation characteristic of each job and a search for a job to be relocated is performed based on this load variation characteristic. A combination of the fourth embodiment and any other embodiment can be regarded as one embodiment of the present invention.

Figure 25:
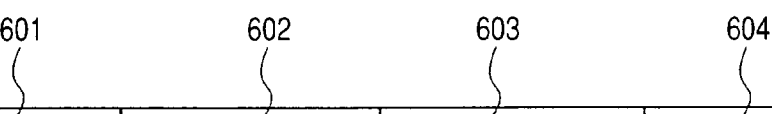
FIG. 25 illustrates a job table 411A in a fourth embodiment of the invention.

FIG. 25 shows a job table 411A in the fourth embodiment. Difference from Embodiment 1 lies in that a fourth column 604 is added. The fourth column 604 has the load variation characteristic of the job given in the first column 601. The load variation characteristic indicates how the utilization performance for the job varies with regard to the time axis; for example, "constant" indicates almost no variation of load and "large variation" indicates that load varies largely. For example, for a job like Web server, in most cases, the load is high during a time zone when a great quantity of service requests from users come, whereas the load is low during other hours. Thus, the load variation characteristic for this job is "large variation". The load variation characteristic is obtained by the jobs properties obtaining function 405. When searching for a job to be relocated, the search function 402 refers to the job table 411A and preferentially selects jobs whose load variation characteristic is "constant" as candidates to be relocated rather than those of "large variation". The load variation characteristic may include information such as variation degrees in terms of I/O utilization performance and memory utilization as performance.

Figure 26:
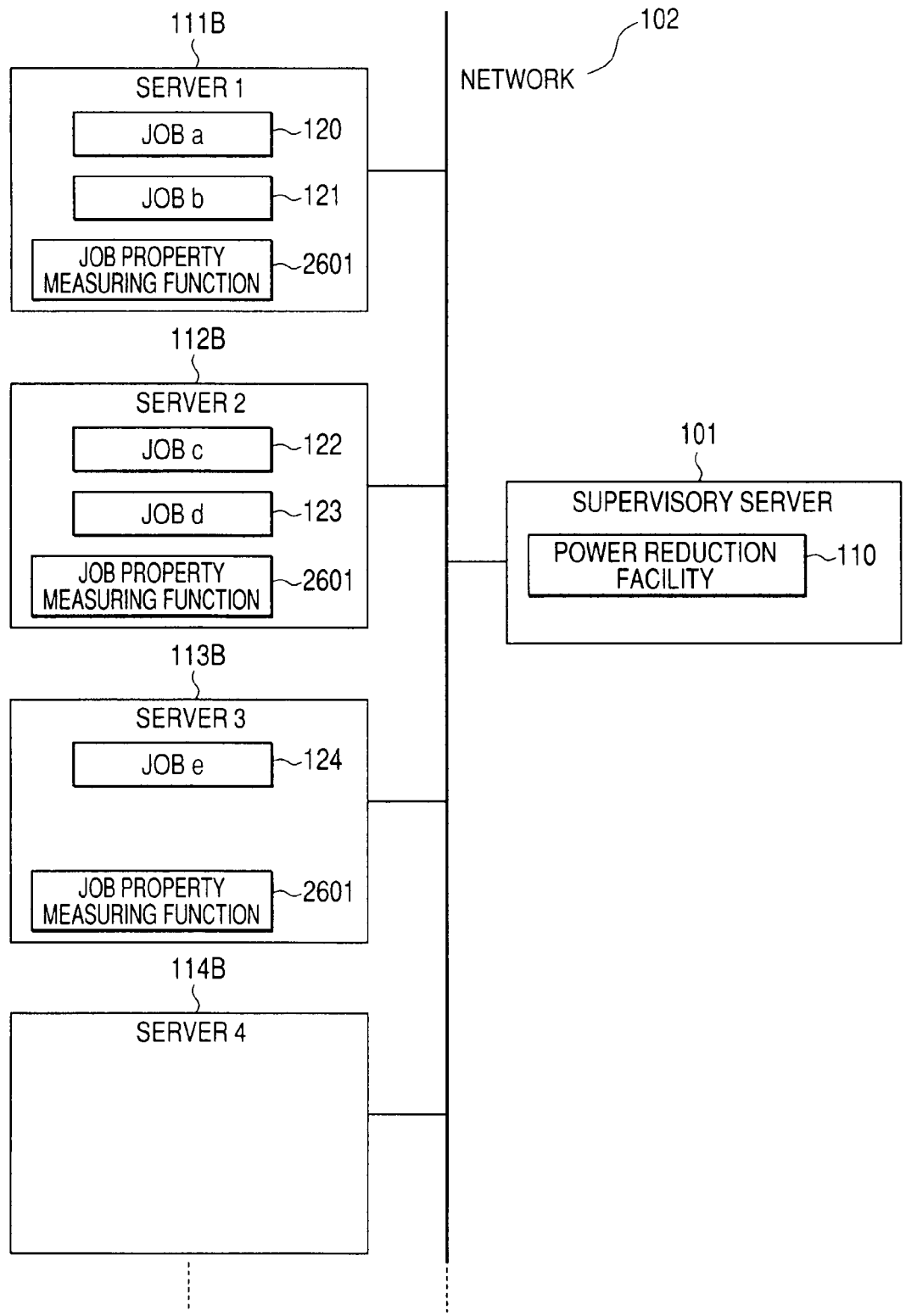
FIG. 26 shows an overall system structural diagram in the fourth embodiment.

FIG. 26 shows a computing system structure in the fourth embodiment. The job property measuring function 2601 within each server 111B-114B can obtain the load variation characteristic of each job by measuring the utilization performance of the running jobs. Also, the job property measuring function 2601 can notify the jobs properties obtaining function 405 of the obtained jobs' load variation characteristics. Here, the job property measuring function 2601 can make use of a program such as, for example, IPI/Performance Management or Linux's top command.

Embodiment 5

A fifth embodiment (Embodiment 5) of the present invention is a method in which the job properties obtaining function in Embodiment 4 obtains priority of job relocation and a search for a job to be relocated is performed based on this priority. A combination of the fifth embodiment and any other embodiment can be regarded as one embodiment of the present invention.

FIG. 27 shows a job table 411B in the fifth embodiment. Difference from Embodiment 4 lies in that a fifth column 605 is added. The fifth column 605 has priority of job relocation for the job given in the first column 601. In the example show here, a priority level is given to each job in selecting a job to be relocated in order of "high", "medium" and "low" and "impossible" denotes impossibility of relocation of the job. The search function 402 refers to this priority value and preferentially selects a job with a "high" priority as the job to be relocated and deselects a job for which the priority value is "impossible".

Embodiment 6

A sixth embodiment (Embodiment 6) of the present invention is a method allowing the user to specify as a search policy a condition for relocation by which the search function 402 in Embodiment 1 searches for a job to be relocated, its source and destination servers. A combination of the sixth embodiment and any other embodiment can be regarded as one embodiment of the present invention.

Figure 28:
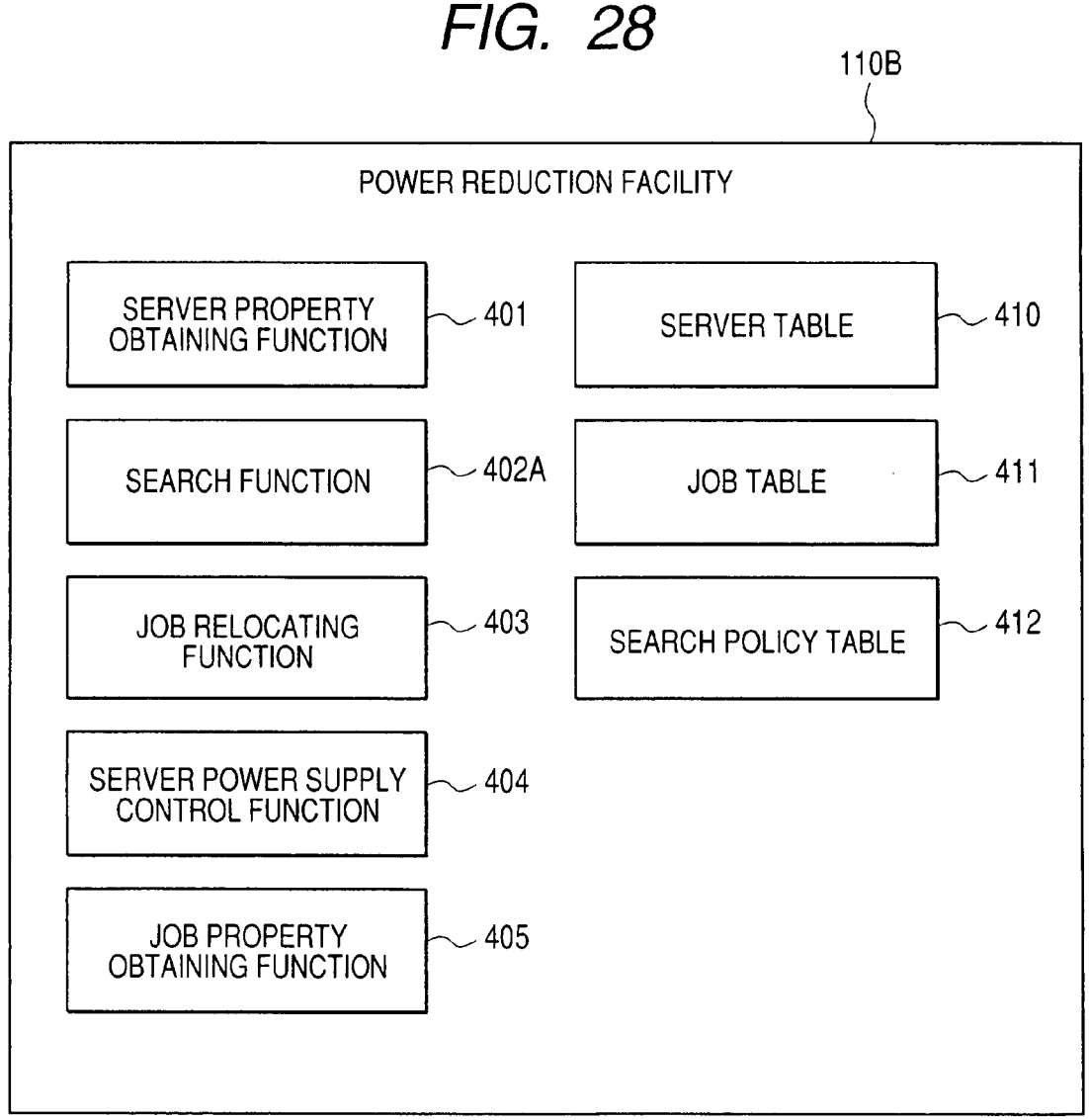
FIG. 28 shows a structural diagram of the power reduction facility 110B in a sixth embodiment of the invention.

FIG. 28 shows details of the power reduction facility 110B in the sixth embodiment. Difference from Embodiment 1 lies in that a search policy table 412 is added. The search function 402A searches for a job to be relocated and its source and destination servers, using one or more conditions defined in the search policy table 412 in addition to the condition that more jobs are allocated to a subset of the servers, while complying with the performance requirements for all jobs running in the computing system, as described in Embodiment 1.

Figures 29, 30:
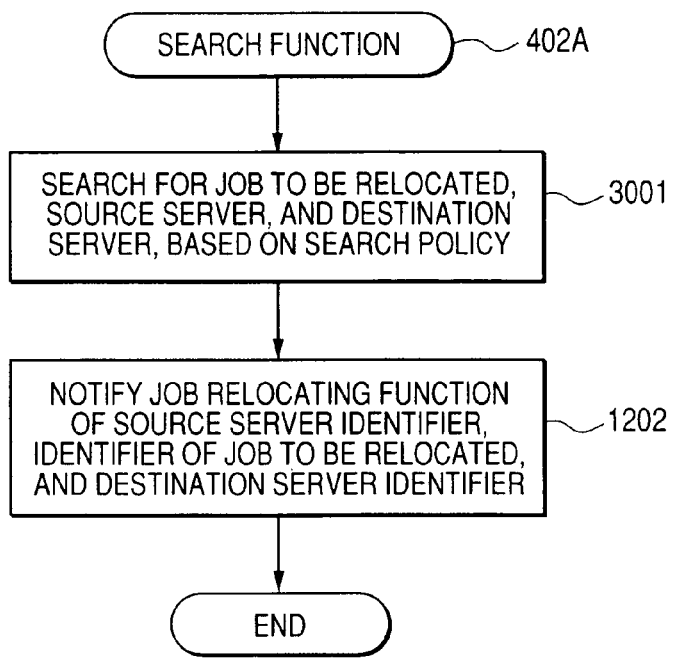
FIG. 29 illustrates a search policy table 412 in the sixth embodiment.
FIG. 30 shows a sub-flowchart of the search function in the sixth embodiment.

FIG. 29 shows details of the search policy table 412. A first column 2901 has the identifier number of a search policy. The user can set a condition for relocation as the condition to be used by the search function 402A by specifying its identifier number and may set a plurality of search policies as the conditions at a time. A second column 2902 has the description of a search policy whose identifier number is given in the first column 2901. Search policies may be registered into this table in different ways: they may be entered by a user by means of the GUI provided by the power reduction facility 110 or using command lines, may be retrieved from a file stored in a storage device connected to the supervisory server 101, and may be acquired via a network. In FIG. 29, a search policy with policy number 1 states that jobs should be relocated to level the powers consumed by each server in the computing system. A search policy with policy number 2 states that jobs should be relocated to have utilization performance at the lowest power consumption per unit of performance at each server, as given in the server table 410. A search policy with policy number 3 states that jobs should be relocated so that only one job runs on the server 2.

FIG. 30 shows an operation flow (procedure) of the search function 402A in the sixth embodiment. Difference from Embodiment 1 is step 3001. Step 3001 is to search for a job to be relocated, its source server and destination server under conditions based on the contents of the search policy table 412. The user can set a policy as the condition to be used by specifying its identifier number and may set a plurality of search policies as the conditions at a time. There are possible methods of setting conditions to be used by the user. Setting may be entered by a user by means of the GUI provided by the power reduction facility 110 or using command lines, may be retrieved from a file stored in a storage device connected to the supervisory server 101, and may be acquired via a network.

In the above description, one or more search policies set by the user are assumed to be used in combination with the default condition for relocation by which the search is performed at step 1201 described in FIG. 12 in Embodiment 1. However, a search policy may be provided to state that the performance requirements for the jobs be ignored. According to this policy, the performance requirements for the jobs may not be fulfilled.

Embodiment 7

A seventh embodiment (Embodiment 7) of the present invention is a method in which verification is performed after the execution of job relocation in Embodiment 1 and recovery processing is performed if a problem is detected. A combination of the seventh embodiment and any other embodiment can be regarded as one embodiment of the present invention.

Figure 31:
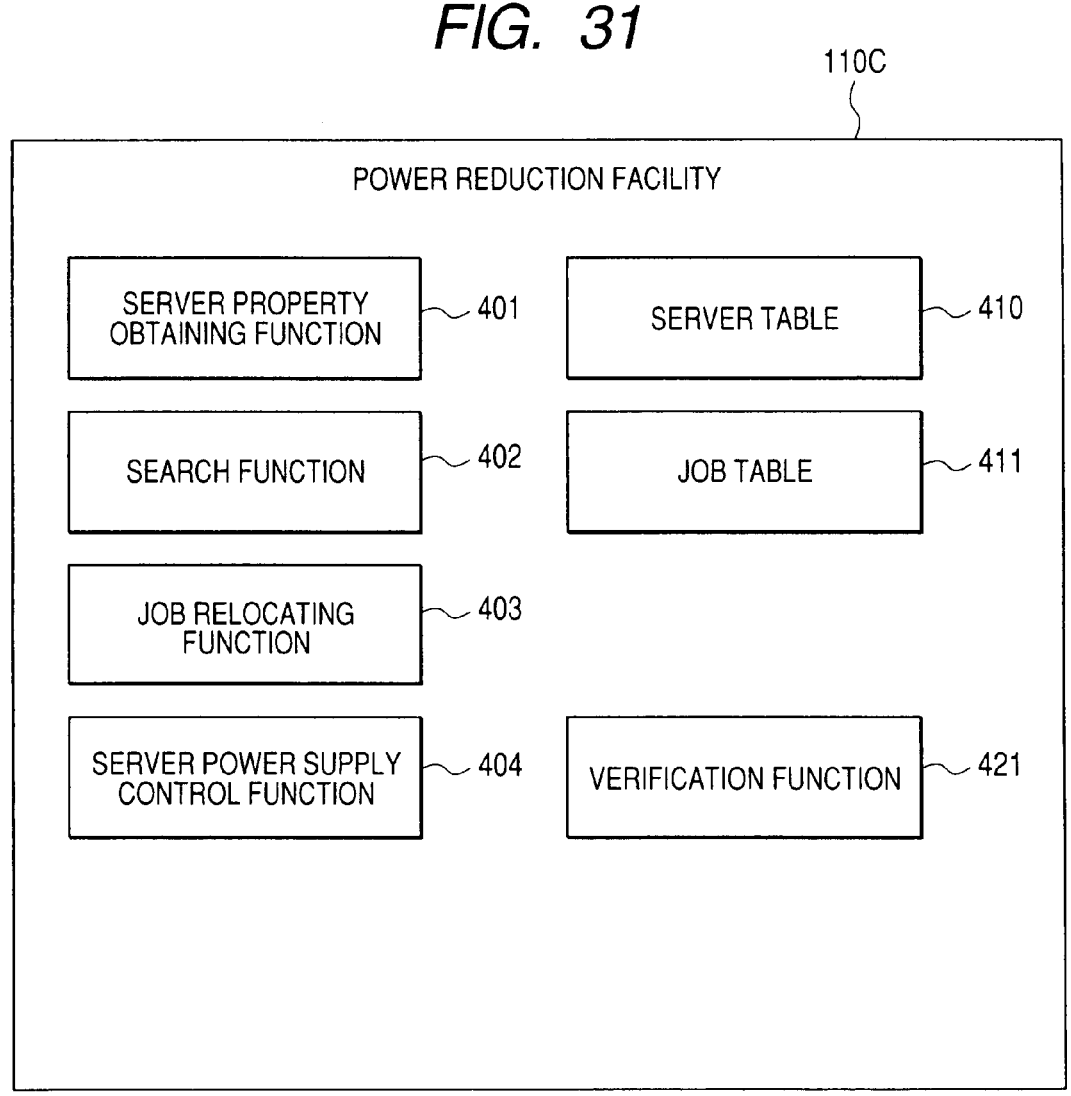
FIG. 31 shows a structural diagram of the power reduction facility 110C in a seventh embodiment of the invention.

FIG. 31 shows details of the power reduction facility 110C in the seventh embodiment. Difference from Embodiment 1 lies in that a verification function 421 is added. The verification function verify the operation status of the computing system after the execution of job relocation.

Figure 32:
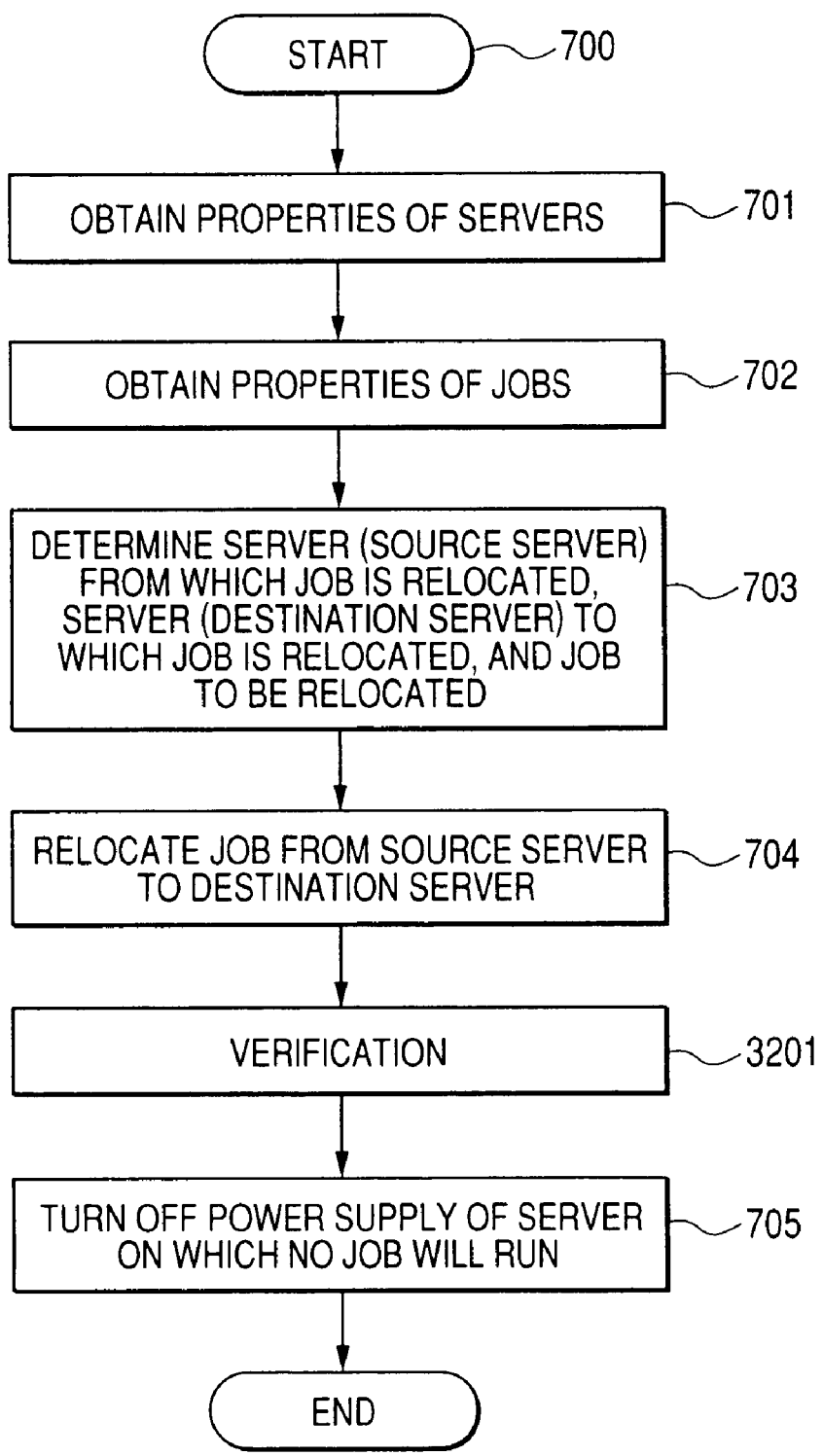
FIG. 32 shows a flowchart of operation of the seventh embodiment.

FIG. 32 shows a general operation flow of Embodiment 7. Difference from Embodiment 1 is step 3201. Step 3201 is to verify the operating status of the whole computing system after job relocation performed at step 704.

Figure 33:
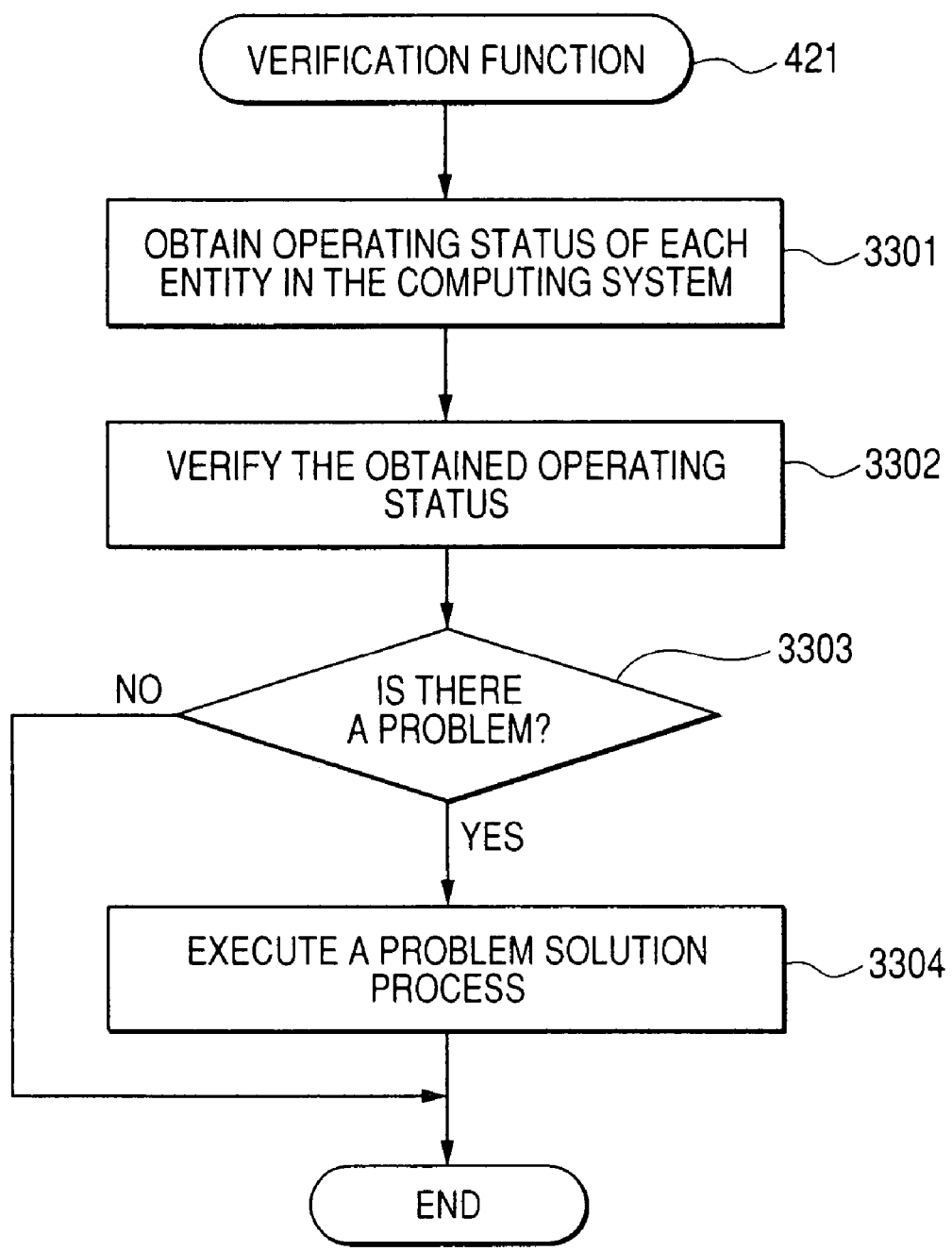
FIG. 33 shows a sub-flowchart of a verification function 3201 in the seventh embodiment.

FIG. 33 shows details of step 3201 as mentioned in FIG. 32. Step 3201 in FIG. 33 corresponds to the operation flow of the verification function 421 as mentioned in FIG. 31. Step 3301 is to obtain the operating status of each of the servers constituting the computing system and each job. Here, the operating status of each server is obtained by obtaining the utilization performance and power consumption of the server by means of the power property measuring function 2101 or the like, as described in Embodiment 3. The operating status of each job is obtained by obtaining the utilization performance for the job by means of the job property measuring function 2601 or the like, as described in Embodiment 4. Step 3302 is to very the operating status of each server and each job obtained at step 3301. The verification function verifies that the performance requirements for all jobs running in the computing system are fulfilled and that the power consumption of the whole computing system is lower than the power consumption before the execution of job relocation. It is determined that there is a problem, if a server does not meet the performance requirements for all jobs running on the server, or if the measured power consumption of the server is significantly larger than the performance and associated power consumption given in the server table 410. However, because the power consumption of the whole computing system varies depending on the operating status of each job, some margin may be added taking this variation into account, when comparing the power consumption after the job relocation with that before the job relocation. Because the power supply of the source server remains on, the verification ignores the power consumption of the source server. At step 3303, a branch occurs, depending on whether there is a problem or not as the result of the verification at step 3302. If there is a problem, the procedure proceeds to step 3304; if there is no problem, the procedure terminates. Step 3304 is to perform a problem solution process for the problem detected at step 3302. The problem solution process may include returning the relocated jobs to the source servers and re-executing the procedure of the search function 402.

Embodiment 8

An eighth embodiment (Embodiment 8) of the present invention is a method in which the server power supply control function 404 in Embodiment 1 turns off the power supply of a server and automatically sets the server to be used as a cold standby server. A combination of the eighth embodiment and any other embodiment can be regarded as one embodiment of the present invention.

Figure 34:
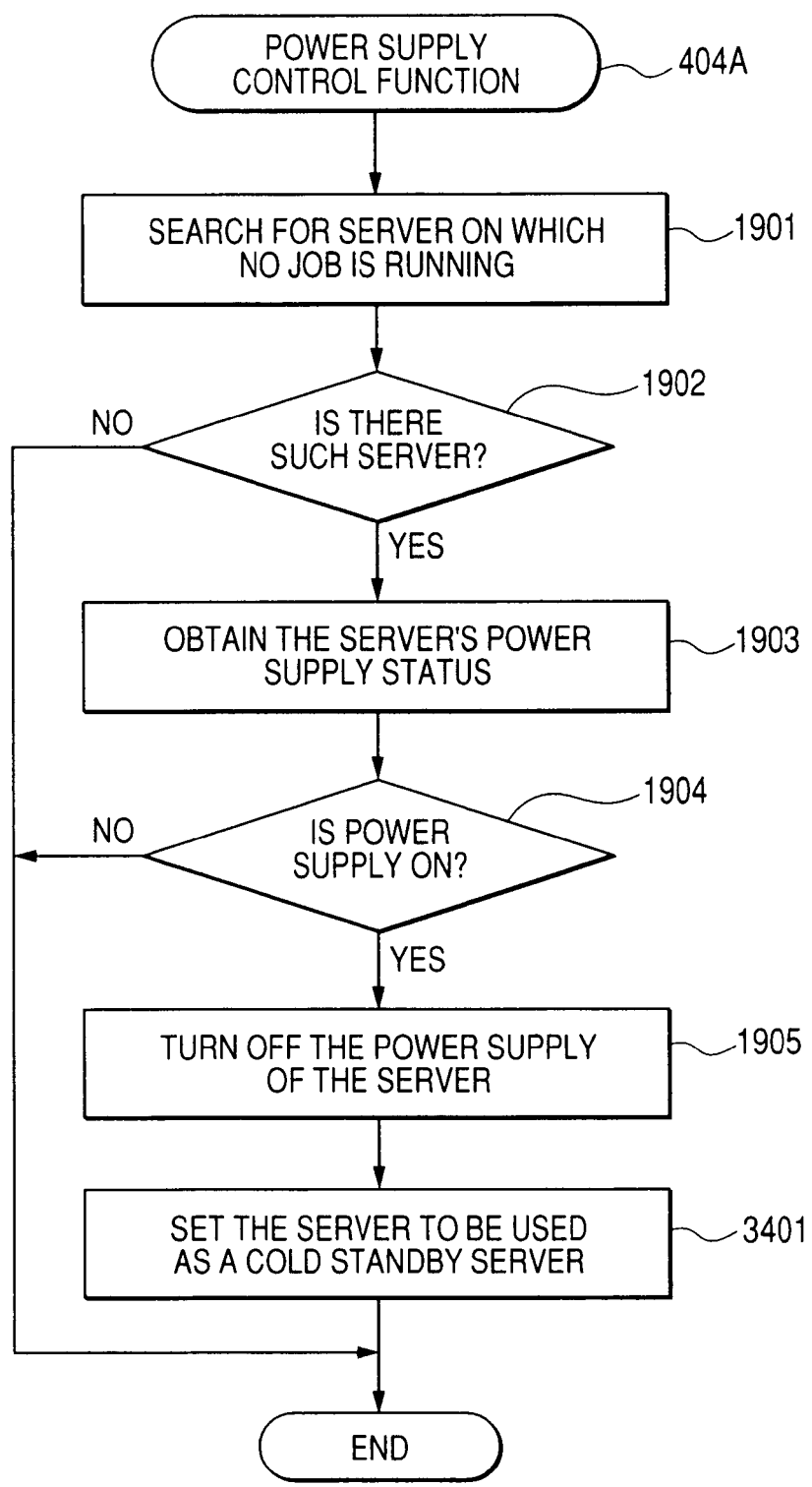
FIG. 34 shows a sub-flowchart of the server power supply control function 404A in an eighth embodiment of the invention.

FIG. 34 an operation flow (procedure) of the server power supply control function 404A in the eighth embodiment. Difference from Embodiment 1 lies in that step 3401 is added. At step 3401, after the server's power supply is turned off at step 1905, the information for the server is sent to a cold standby function. Having received the information, the cold standby function automatically uses the server as a cold standby server. Here, the cold standby function hands over the job(s) running on an active server to another standby server if a fault occurs in the active server and makes the job(s) impossible to continue or when instructed by the user.

Embodiment 9

A ninth embodiment (Embodiment 9) of the present invention is a system configuration where a special supervisory server is not installed. This is an example of operation in which power reduction facilities run on each sever running jobs, unlike Embodiment 1 where the power reduction facility 110 runs in the supervisory server 101, as described for FIG. 1. A combination of the ninth embodiment and any other embodiment can be regarded as one embodiment of the present invention.

Figure 35:
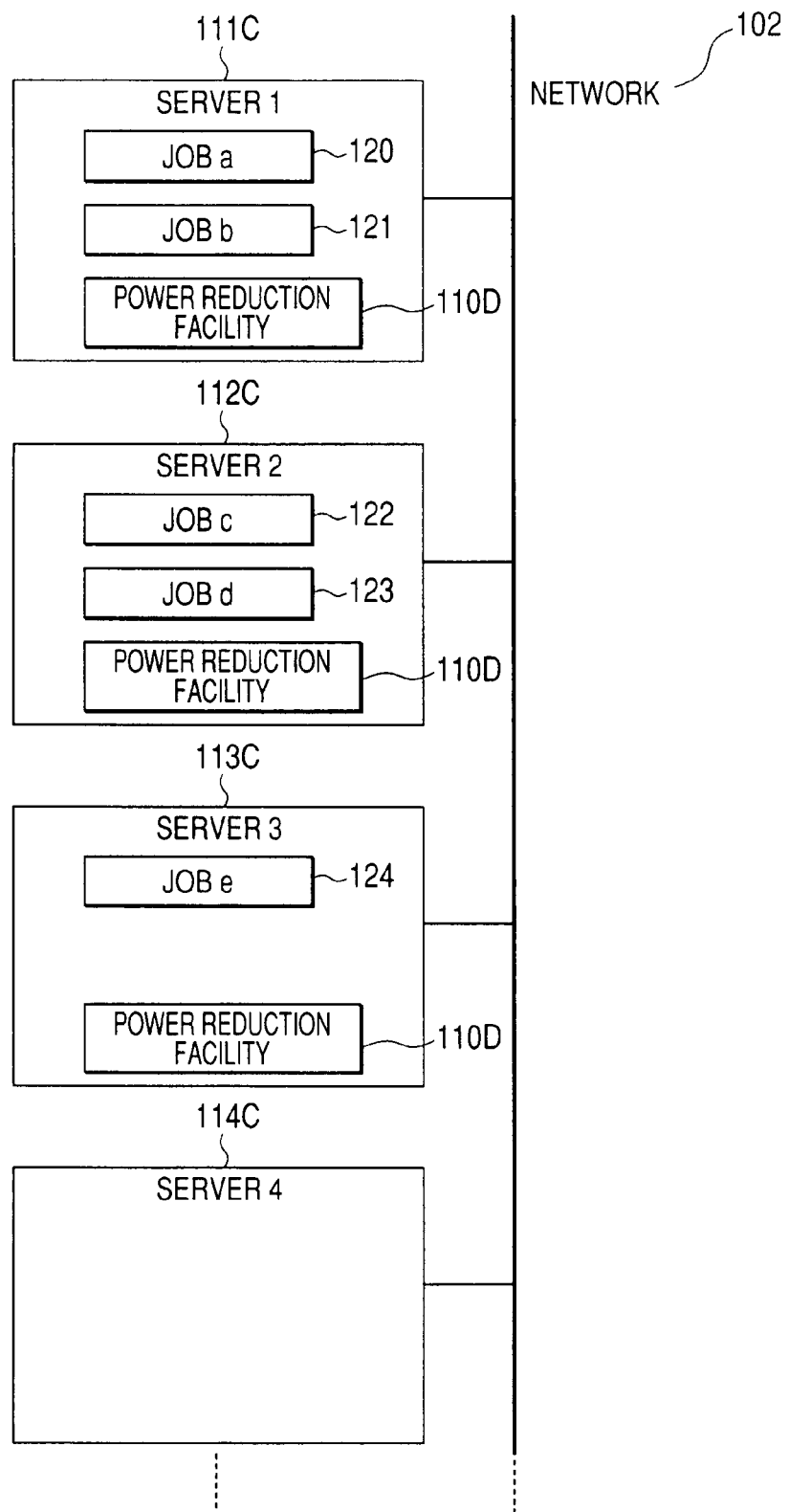
FIG. 35 shows an overall system structural diagram according to a ninth embodiment of the invention.

FIG. 35 shows a structure of the computing system in Embodiment 9. Difference from Embodiment 1 lies in that power reduction facilities 110D run on the servers 111C-114C. In the present embodiment, the power reduction facilities 110D may be regarded as jobs as defined herein, but these power reduction facilities 110D are not the objects to be relocated. To exclude the power reduction facilities 110D from the objects to be relocated, they are not included in the job table 411, 411A, 411B. That is, the power reduction facilities 110D are not listed up when creating the job table 411.

The power reduction facilities 110D are regarded as programs that are automatically start when each server is booted, like OS. In the system structure of FIG. 35, if, for example, a job e 124 existing on a server 113C is relocated to a server 111C or 112C by the power reduction facility 110D, there will be no job running on the server 113C. Therefore, the power supply of the server 113C is turned off and, at the same time, the power reduction facility 110D on the server 113C is deactivated. Thereafter, control is exercised by the power reduction facility 110D on the server 111C or 112C.

By the method and computer program for reducing the power consumption of a computing system of the present invention, described above in detail, in the computing system where a plurality of servers are connected by a network and one or more jobs are run, it is possible to reduce the power consumed, while complying with the SLA of the computing system.

The computing system in which the present invention is applied may be an intelligent home appliance system. The invention is also effective as the method for reducing the power consumption of the intelligent home appliance system. For example, in a situation where, during the operation of an air conditioner, a microwave oven connected to the air condition by home networking or the like is used, by applying the present invention, such application is possible that the air conditioner is temporarily deactivated so that no power is consumed by it, thereby ensuring stable power distribution to the microwave oven. Needless to say, each server is configured with the controller's CPU and a program memory in each of home appliance products constituting the intelligent home appliance system.

What is claimed is:

1. A method for reducing power consumption of a computing system wherein a plurality of servers are connected to each other via a network and one or more jobs are run, the method comprising the following steps, which are executed by at least one of the plurality of servers:

obtaining server-related information including power properties of each of the plurality of servers constituting the computing system, and obtaining performance values and associated power consumptions of each of the plurality of servers;

obtaining job-related information including performance requirements for each of the jobs which are run in the computing system;

searching for one or more jobs to be relocated and one or more destination servers to which the one or more jobs are to be relocated, based on the server-related information and the job-related information, to the extent that the performance requirements for each of the jobs are fulfilled, wherein a source server of the plurality of servers runs the one or more jobs to be relocated;

selecting the one or more jobs to be relocated, and selecting the one or more destination servers to which the one or more jobs selected are to be relocated;

relocating the one or more jobs selected from the source server to the one or more destination servers selected, wherein the one or more destination servers selected fulfilled the performance requirements for each of the one or more jobs selected;

searching for one or more of the plurality of servers on which no job is running; and when the one or more of the plurality of servers on which no job is running is found and the power supply of the one or more of the plurality of servers on which no job is running is powered on, turning off the power supply of the one or more servers on which no job is running after the relocation of the one or more jobs, wherein the power properties of the plurality of servers are power consumptions per unit of performance, based on the performance values and associated power consumptions of the plurality of servers.

2. The method according to claim 1, wherein each of the plurality of servers has a power property measuring program for measuring the power properties.

3. The method according to claim 1, wherein each of the plurality of servers has a job property measuring program for measuring the job properties, and wherein the method further comprises:

in the step of obtaining the job-related information, obtaining variation characteristics of utilization performance for the jobs, as measured by operating the job property measuring program.

4. The method according to claim 1, wherein the method further comprises:

in the searching step, searching for one or more destination servers, based on a condition that more jobs are allocated to a subset of the plurality of servers that has a smallest or smaller value of power consumption per unit of performance to the extent that performance requirements for each job are fulfilled.

5. The method according to claim 1, wherein the method further comprises:

in the searching step, searching for one or more jobs to be relocated, based on a condition of minimizing the number of servers on which jobs are running among the server.

6. The method according to claim 1, wherein the method further comprises:

in the searching step, searching for one or more jobs to be relocated and one or more destination servers, based on at least one of search policies which can be defined by a user.

7. The method according to claim 1, wherein the method further comprises:

in the relocating step, relocating the one or more jobs without deactivating the one or more jobs during relocation.

8. The method according to claim 1, further comprising:

verifying, by at least one of the plurality of servers, the operating status of each entity of the computing system.

9. The method according to claim 1, further comprising:

detecting, by at least one of the plurality of servers, at least one of events that trigger execution of the method, the at least one of the events involving a change in the configuration of the computing system, a change in power supply environment, or a change in the power consumption of each or all of the servers.

10. A computer-readable storage medium having tangibly embodied thereon a computer program for reducing the power consumption of a computing system including a plurality of servers which are connected to each other via a network and upon which one or more jobs are run, wherein the computer program, when executed by the computer system, causes at least one of the servers to perform the steps of:

obtaining server-related information including power properties of each of the servers constituting the computing system, and obtaining performance values and associated power consumptions of each of the plurality of servers;

obtaining job-related information including performance requirements for each of the jobs which are run in the computing system;

searching for one or more jobs to be relocated and one or more destination servers to which the one or more jobs are to be relocated, based on the server-related information and the job-related information, to the extent that the performance requirements for each of the jobs are fulfilled, wherein a source server of the plurality of servers runs the one or more jobs to be relocated;

selecting the one or more jobs to be relocated, and selecting the one or more destination servers to which the one or more jobs selected are to be relocated;

relocating the one or more jobs selected from the source server to the one or more destination servers, wherein the one or more destination servers selected fulfilled the performance requirements for each of the one or more jobs selected;

searching for one or more of the plurality of servers on which no job is running; and when the one or more of the plurality of servers on which no job is running is found and the power supply of the one or more of the plurality of servers on which no job is running is powered on, turning off the power supply of the one or more servers on which no job is running after the relocation of the one or more jobs, wherein the power properties of the plurality of servers are power consumptions per unit of performance, based on the performance values and associated power consumptions of the plurality of servers.

11. The computer-readable storage medium according to claim 10, wherein each of the plurality of servers has a power property measuring program for measuring the power properties.

12. The computer-readable storage medium according to claim 10,
wherein each of the plurality of servers has a job property measuring program for measuring the job properties, and
wherein in the step of obtaining the job-related information, the job property measuring program causes at least one of the plurality of servers to perform a step of obtaining variation characteristics of utilization performance for the jobs.

13. The computer-readable storage medium according to claim 10, wherein the step of searching further includes searching for one or more destination servers, based on a condition that more jobs are allocated to a subset of the plurality of servers that has a smallest or smaller value of power consumption per unit of performance to the extent that performance requirement for each job are fulfilled.

14. The computer-readable storage medium according to claim 10, wherein the step of searching further includes searching for one or more jobs to be relocated, based on a condition of minimizing the number of servers on which jobs are running among the plurality of servers.

15. The computer-readable storage medium according to claim 10, wherein the step of searching further includes searching for one or more jobs to be relocated and one or more destination servers, based on at least one of search policies which can be defined by a user.

16. The computer-readable storage medium according to claim 10, wherein the one or more jobs are relocated without deactivating the one or more jobs during relocation.

17. The computer-readable storage medium according to claim 10, wherein the computer program, when executed by the computer system, further causes at least one of the plurality of servers to perform the step of:
verifying the operating status of each entity of the computing system at least after the relocation of the one or more jobs.

18. A computing system where one or more jobs are run, the computer system comprising:
a plurality of servers connected via a network,
wherein at least one server of the plurality of servers executes a program, stored on a computer-readable storage medium having the program tangibly embodied thereon, for reducing the power consumption of the computing system, and
wherein said program, when executed, causes said at least one server to perform the steps of:
obtaining server-related information including power properties of each of the plurality of servers constituting the computing system, and obtaining performance values and associated power consumptions of each of the plurality of servers;
obtaining job-related information including performance requirements for each of the jobs which are run in the computing system;
searching for one or more jobs to be relocated and one or more destination servers to which the one or more jobs are to be relocated, based on the server-related information and the job-related information, to the extent that the performance requirements for each of the jobs are fulfilled,
wherein a source server of the plurality of servers runs the one or more jobs to be relocated;
selecting the one or more jobs to be relocated, and selecting the one or more destination servers to which the one or more jobs selected are to be relocated;
relocating the one or more jobs selected from the source server to the one or more destination servers selected,
wherein the one or more destination servers selected fulfilled the performance requirements for each of the one or more jobs selected;
searching for one or more of the plurality of servers on which no job is running;
when the one or more of the plurality of servers on which no job is running is found and the power supply of the one or more of the plurality of servers on which no job is running is powered on, turning off the power supply of the one or more servers on which no job is running after the relocation of the one or more jobs,
wherein the power properties of the plurality of servers are power consumptions per unit of performance, based on the performance values and associated power consumptions of the plurality of servers.

* * * * *